(12) United States Patent
Negoro et al.

(10) Patent No.: US 12,476,124 B2
(45) Date of Patent: Nov. 18, 2025

(54) SUBSTRATE PROCESSING CONDITION SETTING METHOD, SUBSTRATE PROCESSING METHOD, SUBSTRATE PROCESSING CONDITION SETTING SYSTEM, AND SUBSTRATE PROCESSING SYSTEM

(71) Applicant: SCREEN Holdings Co., Ltd., Kyoto (JP)

(72) Inventors: Sei Negoro, Kyoto (JP); Kensuke Shinohara, Kyoto (JP); Masahiro Tokuyama, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 225 days.

(21) Appl. No.: 18/166,327

(22) Filed: Feb. 8, 2023

(65) Prior Publication Data
US 2023/0268208 A1 Aug. 24, 2023

(30) Foreign Application Priority Data
Feb. 18, 2022 (JP) ................. 2022-024128

(51) Int. Cl.
*H01L 21/67* (2006.01)
*G05B 19/418* (2006.01)

(52) U.S. Cl.
CPC .. *H01L 21/67276* (2013.01); *G05B 19/41875* (2013.01); *G05B 2219/32368* (2013.01)

(58) Field of Classification Search
CPC ......... H01L 21/67276; H01L 21/67051; H01L 21/67253; H01L 21/6708;
(Continued)

(56) References Cited

U.S. PATENT DOCUMENTS

2004/0180277 A1   9/2004   Harumoto et al.
2008/0294280 A1*  11/2008  Okita .............. G05B 19/41875
                                                          257/E21.627
(Continued)

FOREIGN PATENT DOCUMENTS

JP    2004172198 A    6/2004
JP    2019-165123 A   9/2019
(Continued)

OTHER PUBLICATIONS

Office Action dated Jul. 27, 2023, issued for the corresponding Taiwanese Patent Application No. 111144553.
(Continued)

*Primary Examiner* — Kidest Worku
*Assistant Examiner* — Kidest Bahta
(74) *Attorney, Agent, or Firm* — OSTROLENK FABER LLP

(57) ABSTRACT

A substrate processing condition setting method includes acquiring, causing, and setting. In the acquiring, a plurality of estimation processing results are acquired by inputting a plurality of processing conditions to a trained model that is subjected to machine training based on a training processing condition and a processing result obtained by processing a substrate under the training processing condition. In the causing, a display section is caused to display an image based on the estimation processing results. In the setting, one processing condition corresponding to one estimation processing result of the estimation processing results is set, as an actual processing condition in substrate processing, based on the image displayed on the display section.

14 Claims, 18 Drawing Sheets

(58) Field of Classification Search
CPC .... G05B 19/41875; G05B 2219/32368; G05B 2219/32187; G05B 2219/32188; G05B 2219/32193; G05B 2219/32194; G05B 2219/45031; G05B 13/0265; G05B 19/418; G06N 20/00
See application file for complete search history.

(56) References Cited

U.S. PATENT DOCUMENTS

| | | | |
|---|---|---|---|
| 2012/0117069 A1* | 5/2012 | Kawanishi | G06V 20/10 707/740 |
| 2019/0295827 A1 | 9/2019 | Ohmori et al. | |
| 2020/0285224 A1* | 9/2020 | Koshiishi | G05B 19/41875 |
| 2020/0333774 A1* | 10/2020 | Banna | H01L 21/67155 |
| 2020/0401120 A1* | 12/2020 | Putman | G05B 13/027 |
| 2021/0035277 A1 | 2/2021 | Ishikawa et al. | |
| 2021/0048794 A1 | 2/2021 | Moki et al. | |
| 2021/0170544 A1 | 6/2021 | Yagi et al. | |
| 2021/0183051 A1 | 6/2021 | Nakago et al. | |
| 2021/0202258 A1 | 7/2021 | Naohara et al. | |
| 2021/0209413 A1 | 7/2021 | Nakago et al. | |
| 2021/0304383 A1 | 9/2021 | Okada | |
| 2022/0327364 A1 | 10/2022 | Hunsche et al. | |
| 2022/0410343 A1 | 12/2022 | Ishibashi | |
| 2023/0161301 A1 | 5/2023 | Ano et al. | |
| 2023/0205178 A1 | 6/2023 | Inaba et al. | |

FOREIGN PATENT DOCUMENTS

| | | |
|---|---|---|
| JP | 2020-004817 A | 1/2020 |
| JP | 2021108367 A | 7/2021 |
| JP | 2021-153137 A | 9/2021 |
| JP | 2021-157303 A | 10/2021 |
| TW | 202113924 A | 4/2021 |
| TW | 202129801 A | 8/2021 |
| TW | 202138122 A | 10/2021 |
| TW | 202147191 A | 12/2021 |
| TW | 202201601 A | 1/2022 |
| WO | WO 2019/155928 A1 | 8/2019 |
| WO | WO 2019/198143 A1 | 10/2019 |
| WO | WO 2020/049974 A1 | 3/2020 |
| WO | WO 2020/050072 A1 | 3/2020 |
| WO | WO 2020105517 A1 | 5/2020 |
| WO | WO 2021/154747 A1 | 8/2021 |
| WO | WO 2021/197717 A1 | 10/2021 |

OTHER PUBLICATIONS

Extended European Search Report dated Jun. 21, 2023, issued in corresponding European Patent Application No. 23155377.7.

* cited by examiner

Scan speed information

| Point (mm) | X1 | X2 | X3 | X4 | X5 | X6 | X7 | X8 | X9 |
|---|---|---|---|---|---|---|---|---|---|
| Speed (mm/s) | Y1 | Y2 | Y3 | Y4 | Y5 | Y6 | Y7 | Y8 | Y9 |

931

| Training processing condition | Processing result |
|---|---|
| #A1 | DA1 |
| #A2 | DA2 |
| #A3 | DA3 |
| #A4 | DA4 |
| #A5 | DA5 |
| ⋮ | ⋮ |

FIG. 12

SUBSTRATE PROCESSING CONDITION SETTING METHOD, SUBSTRATE PROCESSING METHOD, SUBSTRATE PROCESSING CONDITION SETTING SYSTEM, AND SUBSTRATE PROCESSING SYSTEM

INCORPORATION BY REFERENCE

The present application claims priority under 35 U.S.C. § 119 to Japanese Patent Application No. 2022-024128, filed on Feb. 18, 2022. The contents of this application are incorporated herein by reference in their entirety.

BACKGROUND

The present disclosure relates to a substrate processing condition setting method, a substrate processing method, a substrate processing condition setting system, and a substrate processing system.

Substrate processing apparatuses are known that perform film thickness adjustment on a processing target, which is a wafer body or a wafer having a surface with a film formed thereon, by liquid treatment. As one of the substrate processing apparatuses as above, a single-wafer type substrate processing apparatus is known that includes a nozzle for supplying a processing liquid for etching to the surface of a wafer. For example, a substrate processing system is known that generates a trained model through machine training based on a data set including substrate processing conditions and performance quality data to derive a recommendable processing condition for substrate processing based on the generated trained model.

SUMMARY

According to a method for deriving an optimum processing condition using a trained model as in the aforementioned substrate processing system, stable substrate processing may not be performed in mass production for example when a processing condition range (also called process window) tolerable in obtaining a specific etching profile is narrow. Also, according to the method used in the substrate processing system, the amount of the processing liquid used may significantly increase under a processing condition under which a specific etch profile is obtained, for example.

That is, a processing condition unsuitable for mass production may be derived by the trained model in the above-described substrate processing method.

A substrate processing condition setting method according to an aspect of the present disclosure includes acquiring a plurality of estimation processing results by inputting a plurality of processing conditions to a trained model that is subjected to machine training based on a training processing condition and a processing result obtained by processing a substrate under the training processing condition; causing a display section to display an image based on the estimation processing results; and setting one processing condition, as an actual processing condition in substrate processing, based on the image displayed on the display section, the one processing condition corresponding to one estimation processing result of the estimation processing results.

In an aspect of the present disclosure, the substrate processing condition setting method may further include setting, prior to the acquiring, an input condition range within which a specific processing condition is included. In the acquiring, the estimation processing results may be obtained by inputting processing conditions, of the processing conditions, within the input condition range to the trained model.

In an aspect of the present disclosure, the processing conditions may each include at least a concentration condition indicating a concentration of a processing liquid to be supplied to a substrate, a temperature condition indicating a temperature of the processing liquid to be supplied to the substrate, a supply amount condition indicating a supply amount of the processing liquid to be supplied to the substrate, a rotational speed condition indicating a rotational speed of the substrate, and a speed condition indicating a scan speed of a nozzle that supplies the processing liquid to the substrate.

In an aspect of the present disclosure, the substrate processing condition setting method may include selecting, prior to the setting one processing condition, the one processing condition by a user based on the image displayed on the display section. In the setting, the selected one processing condition may be set as the actual processing condition.

In an aspect of the present disclosure, the image may include a distribution chart. The processing conditions may each include a plurality of parameters. The distribution chart may be displayed three-dimensionally using the estimation processing results and two types of parameters of the parameters, the estimation processing results and the two types of the parameters being specified by the user.

In an aspect of the present disclosure, the display section may display a user-selectable selection area for selection of the two types of the parameters each as a variable of the distribution chart.

In one aspect of the present disclosure, the display section may display a plurality of marks on the distribution chart, the marks each being user selectable. In the selecting, the one processing condition may be selected as a result of the user selecting one of the marks.

In an aspect of the present disclosure, the marks may include: a first mark displayed within a specific range in the distribution chart within which a point corresponding to a target processing result is included; and a second mark displayed outside the specific range in the distribution chart, the second mark being different from the first mark.

A substrate processing method according to an aspect of the present disclosure includes: setting, according to the aforementioned substrate processing condition setting method, the one processing condition as the actual processing condition; and performing the substrate processing under the one processing condition.

A substrate processing condition setting system according to an aspect of the present disclosure includes storage, a display section, and a controller. The storage stores therein a training processing condition and a trained model that is subjected to machine training based on a processing result obtained by processing a substrate under the training processing condition. The controller acquires a plurality of estimation processing results by inputting a plurality of processing conditions to the trained model. The controller causes the display section to display an image based on the estimation processing results. The controller sets one processing condition as an actual processing condition in substrate processing, the one processing condition corresponding to one estimation processing result of the estimation processing results.

In an aspect of the present disclosure, the controller may acquire the estimation processing results by inputting to the trained model processing conditions, of the processing conditions, within an input condition range within which a specific processing condition is included.

In an aspect of the present disclosure, the processing conditions may each include at least a concentration condition indicating a concentration of a processing liquid to be supplied to a substrate, a temperature condition indicating a temperature of the processing liquid to be supplied to the substrate, a supply amount condition indicating a supply amount of the processing liquid to be supplied to the substrate, a rotational speed condition indicating a rotational speed of the substrate, and a speed condition indicating a scan speed of a nozzle that supplies the processing liquid to the substrate.

In an aspect of the present disclosure, the substrate processing condition setting system may further include an operation section that receives an operation by a user. The controller may set the one processing condition as the actual processing condition, the one processing condition being selected by the user through the operation section.

In an aspect of the present disclosure, the image may include a distribution chart. The processing conditions may each include a plurality of parameters. The controller may cause display of the distribution chart three-dimensionally using the estimation processing results and two types of the parameters of the parameters, the estimation processing results and the two types of parameters being specified by the user.

In an aspect of the present disclosure, the display section may display a user-selectable selection area for selection of the two types of the parameters each as a variable of the distribution chart.

In an aspect of the present disclosure, the display section may display a plurality of marks on the distribution chart, the marks being user selectable. When the user selects one mark of the marks through the operation section, the controller may set the one processing condition as the actual processing condition, the one processing condition corresponding to the one mark.

In an aspect of the present disclosure, the marks may include: a first mark displayed within a specific range in the distribution chart within which a point corresponding to a target processing result is included; and a second mark displayed outside the specific range in the distribution chart, the second mark being different from the first mark.

A substrate processing system according to an aspect of the present disclosure includes the aforementioned substrate processing condition setting system and a processing unit that performs the substrate processing under the one processing condition.

BRIEF DESCRIPTION OF THE DRAWINGS

FIG. 12 is a diagram of a training data set in the first embodiment of the present disclosure.

DETAILED DESCRIPTION

Figure 1:
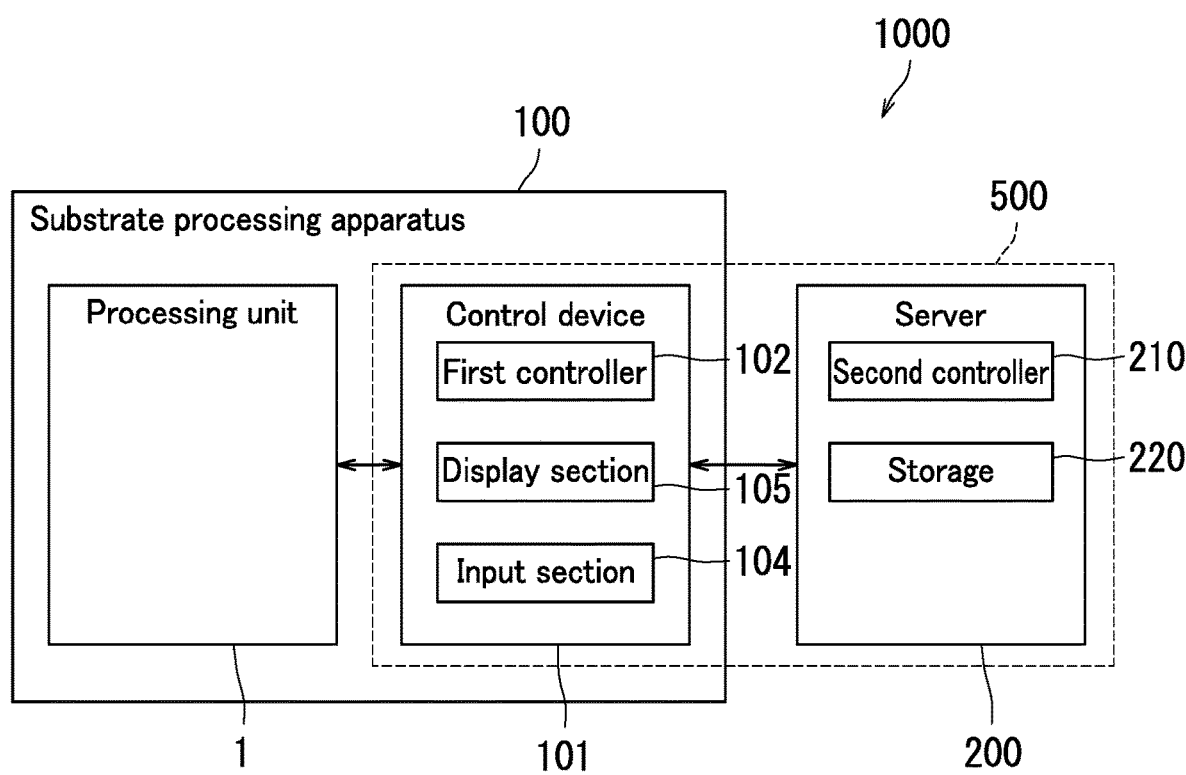
FIG. 1 is a diagram of the overall configuration of a substrate processing system according to a first embodiment of the present disclosure.

The following described embodiments of the present disclosure with reference to the accompanying drawings. However, the present disclosure is not limited to the following embodiments and can be practiced within a scope not deviating from the gist of the present disclosure with alterations made as appropriate. Some overlapping explanations may be omitted as appropriate. Furthermore, elements that are the same or equivalent are indicated by the same reference signs in the drawings and description thereof is not repeated.

First Embodiment

Figure 2:
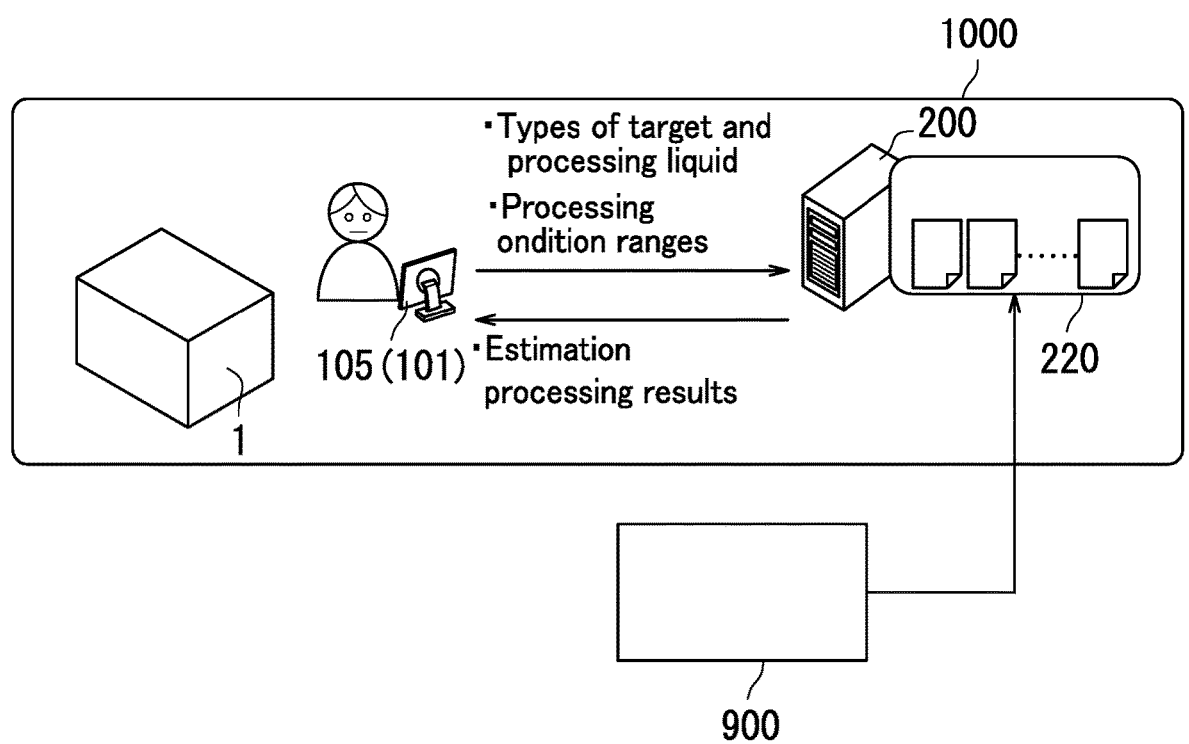
FIG. 2 is a schematic diagram of the overall configuration of the substrate processing system according to the first embodiment of the present disclosure.

With reference to FIGS. 1 to 19, a substrate processing system 1000 according to a first embodiment of the present disclosure will be described. FIG. 1 is a diagram illustrating an overall configuration of the substrate processing system 1000 according to the present embodiment. FIG. 2 is a schematic diagram of the overall configuration of the substrate processing system 1000 according to the present embodiment.

As illustrated in FIGS. 1 and 2, the substrate processing system 1000 includes a processing unit 1 and a setting system 500 for substrate processing condition setting. The setting system 500 includes a first controller 102, a second controller 210, and storage 220. The setting system 500 further includes a display section 105 and an input section 104. Note that the first controller 102 and the second controller 210 each are an example of a "controller" in the present disclosure. The input section 104 is an example of an "operation section" in the present disclosure. The substrate processing system 1000 will now be describe below in detail.

The substrate processing system 1000 in the present embodiment includes a substrate processing apparatus 100 and a server 200. The substrate processing apparatus 100 includes processing units 1 and a control device 101. The control device 101 and the server 200 constitute the setting system 500 for substrate processing condition setting.

Figure 3:
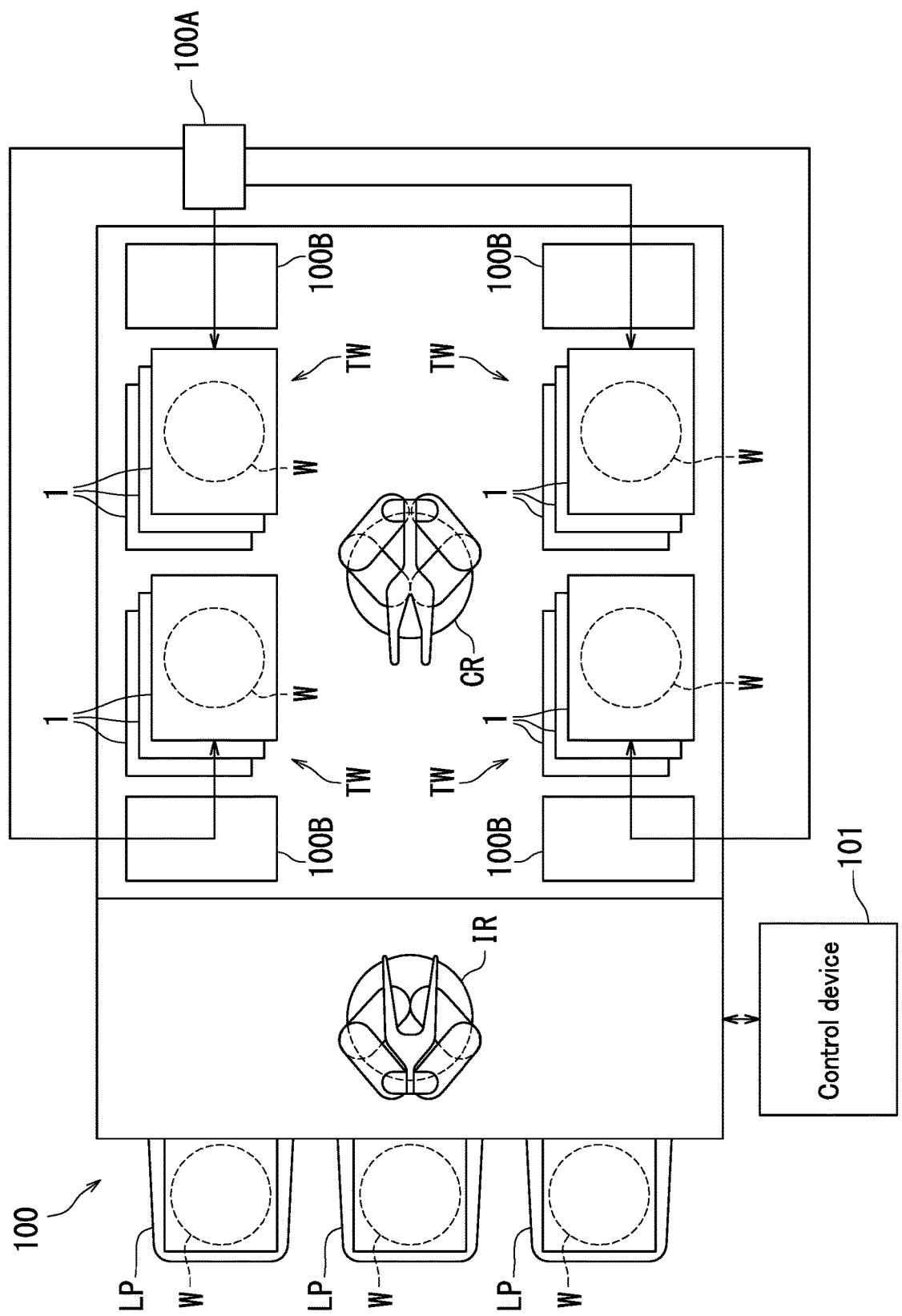
FIG. 3 is a schematic diagram of a substrate processing apparatus in the first embodiment of the present disclosure.

The substrate processing apparatus 100 will be described next with reference to FIGS. 3 and 4. FIG. 3 is a schematic diagram of the substrate processing apparatus 100 in the present embodiment. In detail, FIG. 3 is a schematic plan view of the substrate processing apparatus 100. The substrate processing apparatus 100 is a single-wafer type apparatus that processes substrates W one at a time. The substrates W each are a semiconductor wafer in the present embodiment. The substrates W are substantially disk-shaped.

As illustrated in FIG. 3, the substrate processing apparatus 100 includes a plurality of processing units 1, a fluid cabinet 100A, a plurality of fluid boxes 100B, a plurality of load ports LP, an indexer robot IR, a center robot CR, and a control device 101.

Each of the load ports LP accommodates a plurality of substrates W in a stacked manner. The indexer robot IR transports the substrates W between the load ports LP and the center robot CR. The center robot CR transports the substrates W between the indexer robot IR and the processing units 1. Each of the processing units 1 performs substrate processing on a substrate W by supplying a processing liquid to the substrate W. The fluid cabinet 100A contains the processing liquid.

The processing units 1 form a plurality of towers TW (4 towers TW in FIG. 3) so as to surround the center robot CR in a plan view. Each of the towers TW includes a plurality of vertically stacked processing units 1 (3 processing units 1 in FIG. 3). The fluid boxes 100B each correspond to one of the towers TW. The processing liquid in the fluid cabinet 100A is supplied to all the processing units 1 included in a tower TW corresponding to one of the fluid boxes 100B via the fluid box 100B.

The control device 101 controls operation of each element of the substrate processing apparatus 100. For example, the control device 101 controls the load ports LP, the indexer robot IR, and the center robot CR.

Figure 4:
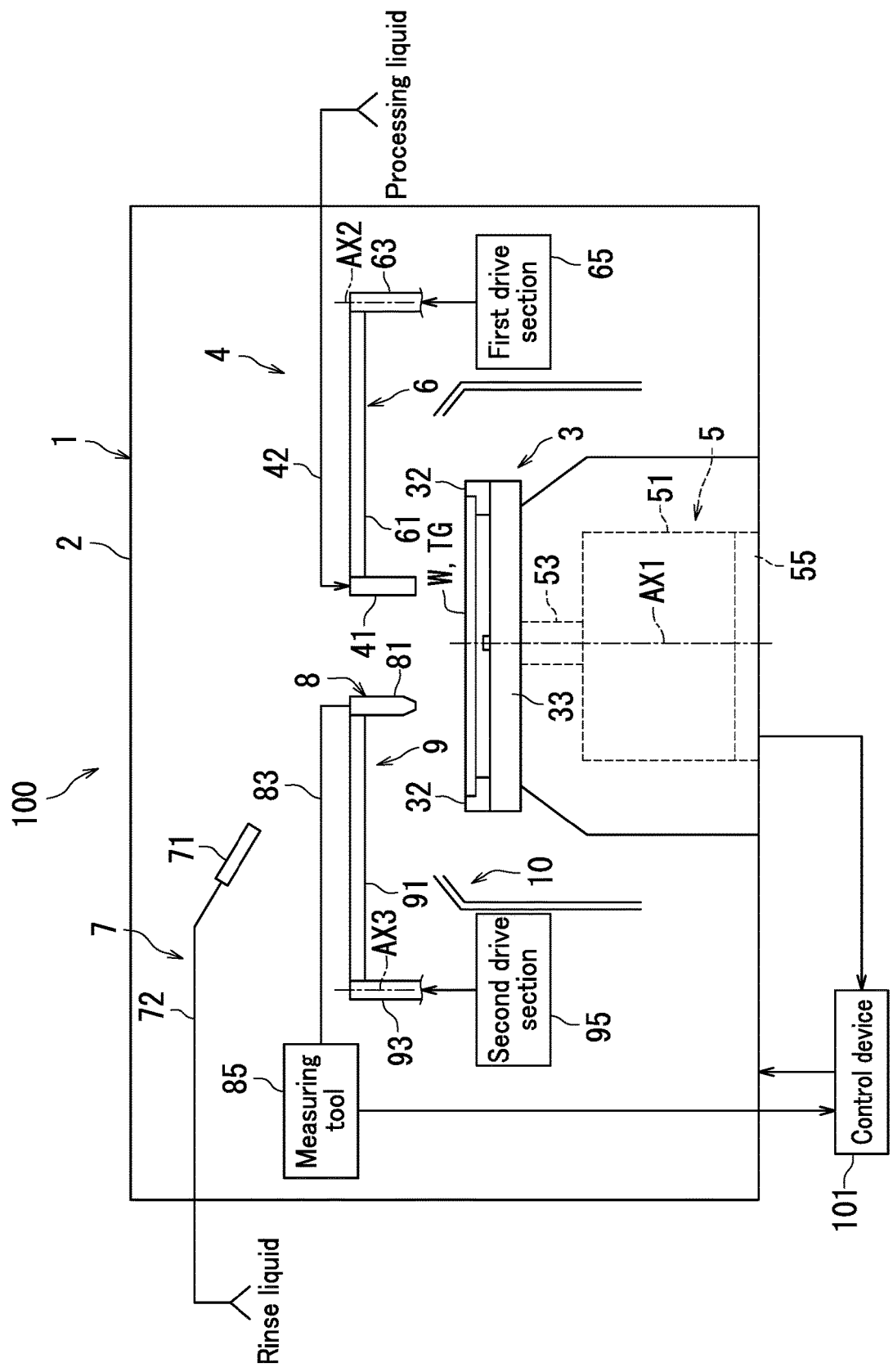
FIG. 4 is a schematic diagram of a processing unit in the first embodiment of the present disclosure.

With reference to FIG. 4, a processing unit 1 of the present embodiment will be described next. FIG. 4 is a schematic diagram of the processing unit 1 of the present embodiment. In detail, FIG. 4 is a schematic cross-sectional view of the processing unit 1.

As illustrated in FIG. 4, the processing unit 1 processes a target constituting a substrate W with the processing liquid. In the following, a target that is a target for processing with the processing liquid will be referred to as "target TG". The target TG is a substrate body (e.g., a substrate body made of silicon) or a substance formed on the surface of the substrate body, for example. The substance formed on the surface of the substrate body is a substance (e.g., a layer made of silicon) made of the same material as that of the substrate body or a substance (e.g., a silicon oxide film, a silicon nitride film, or a resist layer) made of a material different from that of the substrate body. The "substance" may form a film.

The processing liquid includes an etching solution and the processing unit 1 performs etching processing in the present embodiment. The target TG is processed (etched) with the etching solution. The etching solution is a chemical liquid. Examples of the etching solution include hydrofluoric nitric acid (mixed liquid of hydrofluoric acid (HF) and nitric acid ($HNO_3$)), hydrofluoric acid, buffered hydrofluoric acid (BHF), ammonium fluoride, hydrofluoric acid diluted by ethylene glycol (HFEG, mixed liquid of hydrofluoric acid and ethylene glycol), phosphorus acid ($H_3PO_4$), Standard Clean 1 (SC1, a mixed liquid of ammonia and hydrogen peroxide), Standard Clean 2 (SC2, a mixed liquid of hydrochloric acid and hydrogen peroxide), sulfuric peroxide mix (SPM, a mixed liquid of sulfuric acid and hydrogen peroxide), and ammonia.

The processing unit 1 includes a chamber 2, a spin chuck 3, a spin motor section 5, a nozzle moving mechanism 6, a measurement section 8, a probe moving mechanism 9, a plurality of guards 10 (2 guards 10 in FIG. 4), a first nozzle 41, and a second nozzle 71. The substrate processing apparatus 100 further includes an etching solution supply section 4 and a rinse liquid supply section 7. The etching solution supply section 4 includes a first supply pipe 42 while the rinse liquid supply section 7 includes a second supply pipe 72. Note that the first nozzle 41 is an example of a "nozzle" in the present disclosure.

The chamber 2 is substantially box-shaped. The chamber 2 accommodates a substrate W, the spin chuck 3, the spin motor section 5, the nozzle moving mechanism 6, the guards 10, the measurement section 8, the probe moving mechanism 9, the first nozzle 41, the second nozzle 71, a part of the first supply pipe 42, and a part of the second supply pipe 72.

The spin chuck 3 holds the substrate W in a horizontal posture. Specifically, the spin chuck 3 includes a plurality of chuck members 32 and a spin base 33. The chuck members 32 are arranged on the spin base 33 along the periphery of the substrate W. The chuck members 32 hold the substrate W in a horizontal posture. The spin base 33 is substantially disk-shaped and supports the chuck members 32 in a horizontal posture.

The spin motor section 5 rotates the spin chuck 3 together with the substrate W about a first rotation axis AX1 as a center. The first rotation axis AX1 extends in the vertical direction. The first rotation axis AX1 extends in a substantially perpendicular direction in the present embodiment. In detail, the spin motor section 5 rotates the spin base 33 about the first rotation axis as a center. The spin base 33 is accordingly rotated about the first rotation axis AX1 as a center. As a result, the substrate W held by the chuck members 32 on the spin base 33 is rotated about the first rotation axis AX1 as a center.

Specifically, the spin motor section 5 includes a motor main body 51, a shaft 53, and an encoder 55. The shaft 53 is connected to the spin base 33. The motor main body 51 rotates the shaft 53. As a result, the spin base 33 is rotated.

The encoder 55 measures the rotational speed of the substrate W. The encoder 55 generates a signal indicating the rotational speed of the substrate W. In detail, the encoder 55 generates a rotational speed signal indicating the rotational speed of the motor main body 51.

The first nozzle 41 supplies the etching solution to the substrate W. In detail, the first nozzle 41 ejects the etching solution toward the substrate W in rotation. The etching solution supply section 4 supplies the etching solution to the first nozzle 41. In detail, the first nozzle 41 is connected to one end of the first supply pipe 42. The etching solution is supplied to the first nozzle 41 via the first supply pipe 42. The first supply pipe 42 is a tubular member through which the etching solution flows.

The nozzle moving mechanism 6 moves the first nozzle 41. The nozzle moving mechanism 6 moves the first nozzle 41 in a substantially horizontal direction in the present embodiment. In detail, the nozzle moving mechanism 6 turns the first nozzle 41 about a second rotation axis AX2 extending in a substantially perpendicular direction. The first nozzle 41 moves (turns) while ejecting the etching solution toward the substrate W. The first nozzle 41 may be called a scan nozzle.

Specifically, the nozzle moving mechanism 6 includes a nozzle arm 61, a first rotary shaft 63, and a first drive section 65. The nozzle arm 61 extends in a substantially horizontal direction. The first nozzle 41 is disposed at the tip end of the nozzle arm 61. The nozzle arm 61 is connected to the first rotary shaft 63. The first rotary shaft 63 extends in a substantially perpendicular direction. The first drive section 65 rotates the first rotary shaft 63 about the second rotation axis AX2 as a center to rotate the nozzle arm 61 along a substantially horizontal plane about the first rotary shaft 63 as a center. As a result, the first nozzle 41 moves along the substantially horizontal plane. In detail, the first nozzle 41 turns about the first rotary shaft 63 serving as the second rotation axis AX2 as a center. The first drive section 65 includes a stepper motor, for example.

The second nozzle 71 supplies the rinse liquid to the substrate W. In detail, the second nozzle 71 ejects the rinse liquid toward the substrate W in rotation. The rinse liquid supply section 7 supplies the rinse liquid to the second nozzle 71. In detail, the rinse liquid is supplied to the second nozzle 71 via the second supply pipe 72. The second supply pipe 72 is a tubular member through which the rinse liquid flows. Examples of the rinse liquid include deionized water, carbonated water, electrolytic ionized water, hydrogen water, ozone water, and dilute hydrochloric acid water (with a concentration of about 10 ppm to 100 ppm, for example). The second nozzle 71 ejects the rinse liquid in a stationary state. The second nozzle 71 may be called a fixed nozzle. Note that the second nozzle 71 may be a scan nozzle.

The guards 10 have a substantially cylindrical shape. The guards 10 receive the etching solution and the rinse liquid drained from the substrate W.

The measurement section 8 acquires surface information relating to the surface of the substrate W. The surface information contains information indicating a thickness distribution of the substrate W, for example. The surface information also contains information indicating a surface shape (profile) of the substrate W, for example. Note that one of the information indicating the thickness distribution of the substrate W and the information indicating the surface shape of the substrate W can be obtained based on the other. That is, acquisition of the information indicating the thickness distribution of the substrate W is substantially equivalent to acquisition of the information indicating the surface shape of the substrate W.

The measurement section 8 measures the thickness of the target TG in a non-contact manner and generates a thickness detection signal indicating the thickness of the target TG. The thickness detection signal is input to the control device 101.

The measurement section 8 measures the thickness of the target TG by spectroscopic interferometry, for example. Specifically, the measurement section 8 includes an optical probe 81, a signal wire 83, and a measuring tool 85. The optical probe 81 includes a lens. The signal wire 83 connects the optical probe 81 to the measuring tool 85. The signal wire 83 includes optical fibers, for example. The measuring tool 85 includes a light source and a photo detector. Light emitted by the light source of the measuring tool 85 is emitted to the target TG via the signal wire 83 and the optical probe 81. Light reflected by the target TG is received by the photo detector of the measuring tool 85 via the optical probe 81 and the signal wire 83. The measuring tool 85 analyzes the light received by the photo detector and calculates the thickness of the target TG. The measuring tool 85 generates a thickness detection signal indicating the calculated thickness of the target TG. Note that the measuring method implemented by the measurement section 8 is not limited to spectroscopic interferometry and may be any other measuring method so long as measurement of the thickness of the target TG can be achieved.

The probe moving mechanism 9 moves the optical probe 81 in a substantially horizontal direction. In detail, the probe moving mechanism 9 turns the optical probe 81 about a third rotation axis AX3 extending in a substantially perpendicular direction as a center. The optical probe 81 moves (turns) while emitting light toward the substrate W. The thickness detection signal accordingly indicates a thickness distribution of the target TG.

Specifically, the probe moving mechanism 9 includes a probe arm 91, a second rotary shaft 93, and a second drive section 95. The probe arm 91 extends in a substantially horizontal direction. The optical probe 81 is disposed at the tip end of the probe arm 91. The probe arm 91 is connected to the second rotary shaft 93. The second rotary shaft 93 extends in a substantially perpendicular direction. The second drive section 95 rotates the second rotary shaft 93 about the third rotation axis AX3 as a center to rotate the probe arm 91 along a substantially horizontal plane about the second rotary shaft 93 as a center. As a result, the optical probe 18 moves along the substantially horizontal plane. In detail, the optical probe 81 turns about the second rotary shaft 93 serving as the third rotation axis AX3 as a center. The second drive section 95 includes a stepper motor, for example.

The control device 101 may calculate a target throughput (target etching amount) based on the thickness detection signal input from the measurement section 8 (measuring tool 85) in manufacture of a semiconductor article.

Figure 5:
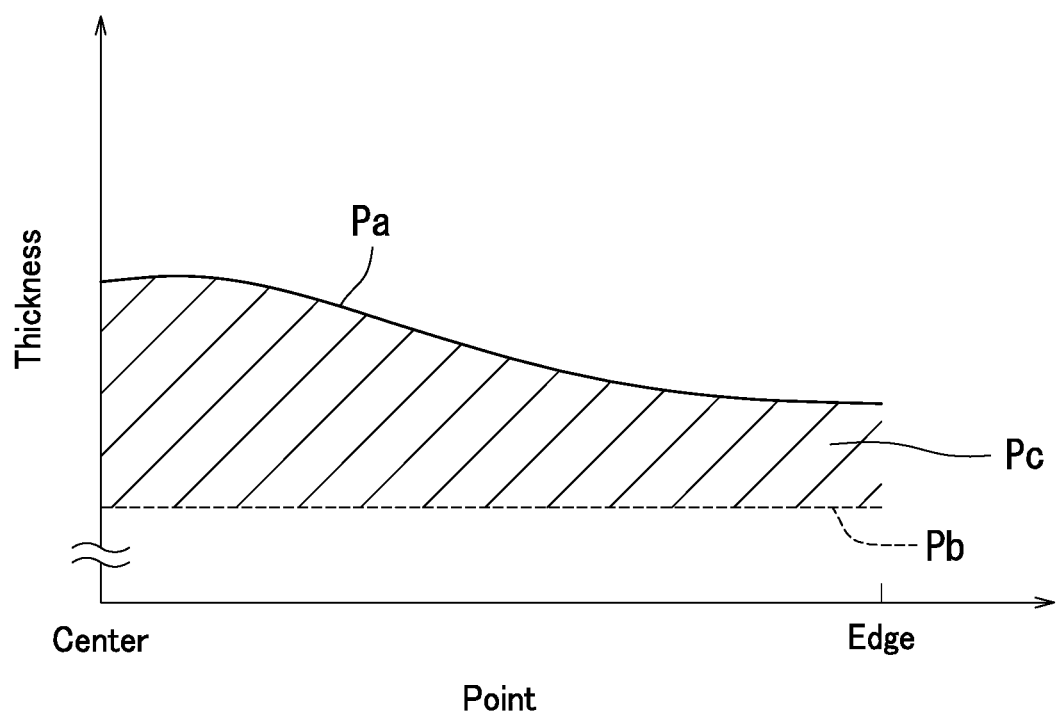
FIG. 5 is a diagram explaining a target throughput.

FIG. 5 is a diagram explaining the target throughput. In FIG. 5, Pa indicates a thickness distribution of the target TG measured by the measurement section 8 before processing. Pb indicates a target thickness distribution of the target TG after processing. An area Pc indicates difference between the thickness distribution Pa of the target TG before processing and the target thickness distribution Pb of the target TG after processing. The difference (area Pc) indicates the target throughput. That is, the first controller 102 can calculate the target throughput by calculating the difference between the target thickness distribution Pb and the thickness distribution Pa actually measured by the measurement section 8.

Furthermore, the control device 101 receives the rotational speed signal from the encoder 55. Note that the rotational speed of the substrate W in processing is constant, for example. In detail, the control device 101 stores therein a recipe 131 for controlling each element of the substrate processing apparatus 100 as will be described with reference to FIG. 9 and the recipe 131 indicates a setting value of the rotational speed of the motor main body 51, for example. The control device 101 controls processing by the processing unit 1 by referencing the recipe 131.

The etching solution supply section 4 adjusts the temperature of the etching solution. For example, the etching solution supply section 4 may include a thermometer and a heater. The etching solution supply section 4 also adjusts the supply amount of the etching solution.

Figures 6, 7:
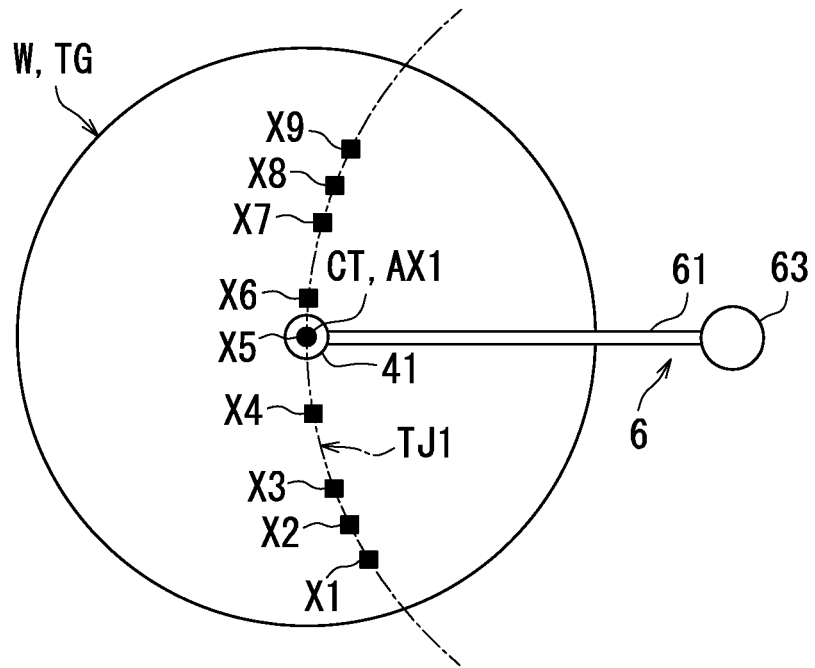
FIG. 6 is a plan view of a substrate in scan processing in the first embodiment of the present disclosure.
FIG. 7 is a diagram illustrating scanning speed information in the first embodiment of the present disclosure.

Scan processing of the substrate W by the first nozzle 41 will be described next with reference to FIG. 6. FIG. 6 is a plan view of a substrate W in the scan processing in the present embodiment. As illustrated in FIG. 6, the scan processing refers to processing in which the first nozzle 41 moves while ejecting the processing liquid (etching solution) toward the target TG so that the landing points of the processing liquid on the surface of the target TG draw an arc-shaped trajectory TJ1 in a plan view. The trajectory TJ1 passes through a center CT of the substrate W. The center CT indicates a point in the substrate W where the first rotation axis AX1 passes. The scan processing is executed during rotation of the substrate W.

The first nozzle 41 ejects the processing liquid (etching solution) toward the substrate W in rotation while moving from a first point X1 to a ninth point X9. Each of the first to ninth points X1 to X9 is included in the trajectory TJ1. A segment from the first point X1 to the ninth point X9 indicates a movement segment along which the first nozzle 41 moves.

Of the first to ninth points X1 to X9, the first point X1 indicates an ejection start point of the processing liquid (etching solution) while the ninth point X9 indicates an ejection stop point of the processing liquid (etching solution). The moving speed of the first nozzle 41 at the first point is 0 mm/s, and the moving speed of the first nozzle 41 at the ninth point X9 is 0 mm/s. As such, the first point X1 is a scan processing start point and the ninth point X9 is a scan processing end point. The first point X1 is also a movement start point of the first nozzle 41, and the ninth point X9 is also a movement end point of the first nozzle 41. Note that the moving speed of the first nozzle 41 in scan processing may be referred to as "scan speed" in the following description.

The first nozzle 41 passes through each intermediate point (each of the second point X2 to the eight points X8) between the first point X1 and the ninth point X9 in scan processing.

Scan speed information will be described next with reference to FIG. 7. The scan speed information indicates setting values of the moving speed (setting values of the scan speed) of the first nozzle 41 in the scan processing. FIG. 7 illustrates the scan speed information in the present embodiment. In detail, FIG. 7 illustrates a relationship between the setting values of the scan speed and the first point X1 to the ninth point X9 each included in the movement segment along which the first nozzle 41 moves as described with reference to FIG. 6.

In FIG. 7, the upper row indicates the points X1 to X9 included in the movement section along which the first nozzle 41 moves while the lower row indicates the setting values of the scan speed. The points X1 to X9 included in the movement segment along which the first nozzle 41 moves are defined according to the points of the radius of the substrate W. In detail, the upper row indicates the start point of the movement segment along which the first nozzle 41 moves (movement start point of the first nozzle 41), the end point of the movement segment along which the first nozzle 41 moves (movement end point of the first nozzle 41), and a plurality of intermediate points (a plurality of points where the first nozzle 41 passes) between the start point and the end point of the movement segment along which the first nozzle 41 moves.

As illustrated in FIG. 7, the scan speed information indicates the setting values of the scan speed at the respective points X1 to X9 included in the movement section along which the first nozzle 41 moves. In the following, the points X1 to X9 included in the movement segment along which the first nozzle 41 moves may each be referred to as "speed set point". In the present embodiment, the scan speed information indicates nine speed set points. Note that the scan speed information may indicate several tens or more (e.g., 20 or more) speed set points.

Specifically, the respective speed set points correspond to the first point X1 to the ninth point X9 described with reference to FIG. 6. As described with reference to FIG. 6, the scan speed set at the start point (first point X1) on the movement segment along which the first nozzle 41 moves is 0 [mm/s] and the scan speed set at the end point (ninth point X9) on the movement segment along which the first nozzle 41 moves is 0 [mm/s]. Note that the first nozzle 41 in scan processing may turn around and move once the first nozzle 41 reaches one end (first point X1) or the other end (ninth point X9) of the movement segment along which the first nozzle 41 moves.

The control device 101 described with reference to FIGS. 3 and 4 controls the nozzle moving mechanism 6 (first drive section 65) based on the scan speed information. As result, the first nozzle 41 moves along the trajectory TJ1 described with reference to FIG. 6 so that the scan speed at each speed set point reaches the scan speed defined in the scan speed information.

Figure 8:
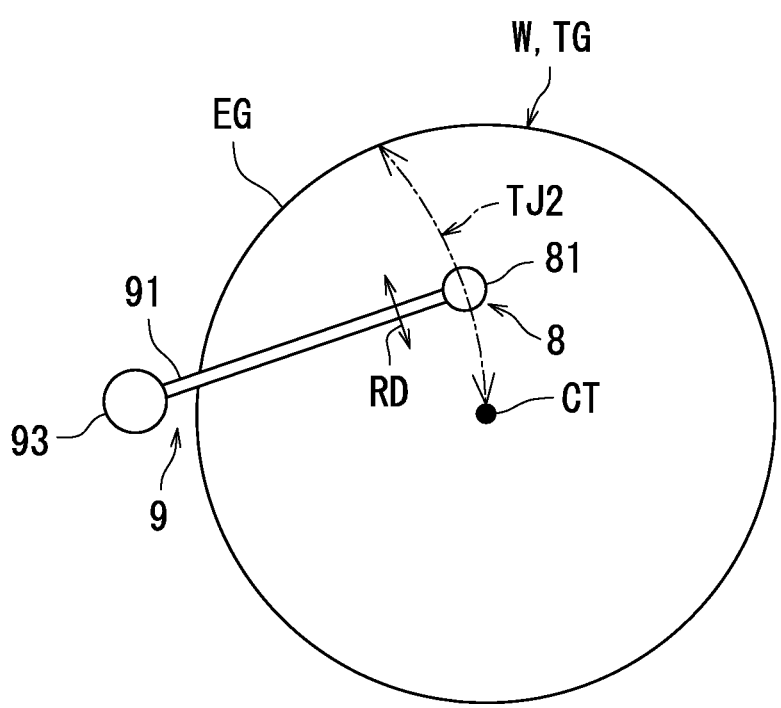
FIG. 8 is a plan view explaining thickness measurement processing in the first embodiment of the present disclosure.

Thickness measurement processing by the measurement section 8 will be described next with reference to FIG. 8. FIG. 8 is a plan view explaining the thickness measurement processing in the present embodiment. As illustrated in FIG. 8, the thickness measurement processing is processing in which the optical probe 81 moves while measuring the thickness of the target TG so that thickness measurement points on the target TG draw an arc-shaped trajectory TJ2. The trajectory TJ2 passes through an edge EG of the substrate W and the center CT of the substrate W. The edge EG is the periphery of the substrate W. The thickness measurement processing is executed during rotation of the substrate W.

Specifically, the optical probe 81 emits light toward the target TG while moving between the center CT and the edge EG of the substrate W in a plan view. As a result, the thickness of the target TG is measured at each measurement point included in the trajectory TJ2. The measurement points correspond to respective points on the radius of the substrate W. As such, a thickness distribution of the target TG in the radial direction RD of the substrate W is measured by the thickness measurement processing. Note that the surface shape (profile) of the target TG matches the shape indicating the thickness distribution of the target TG.

Figure 9:
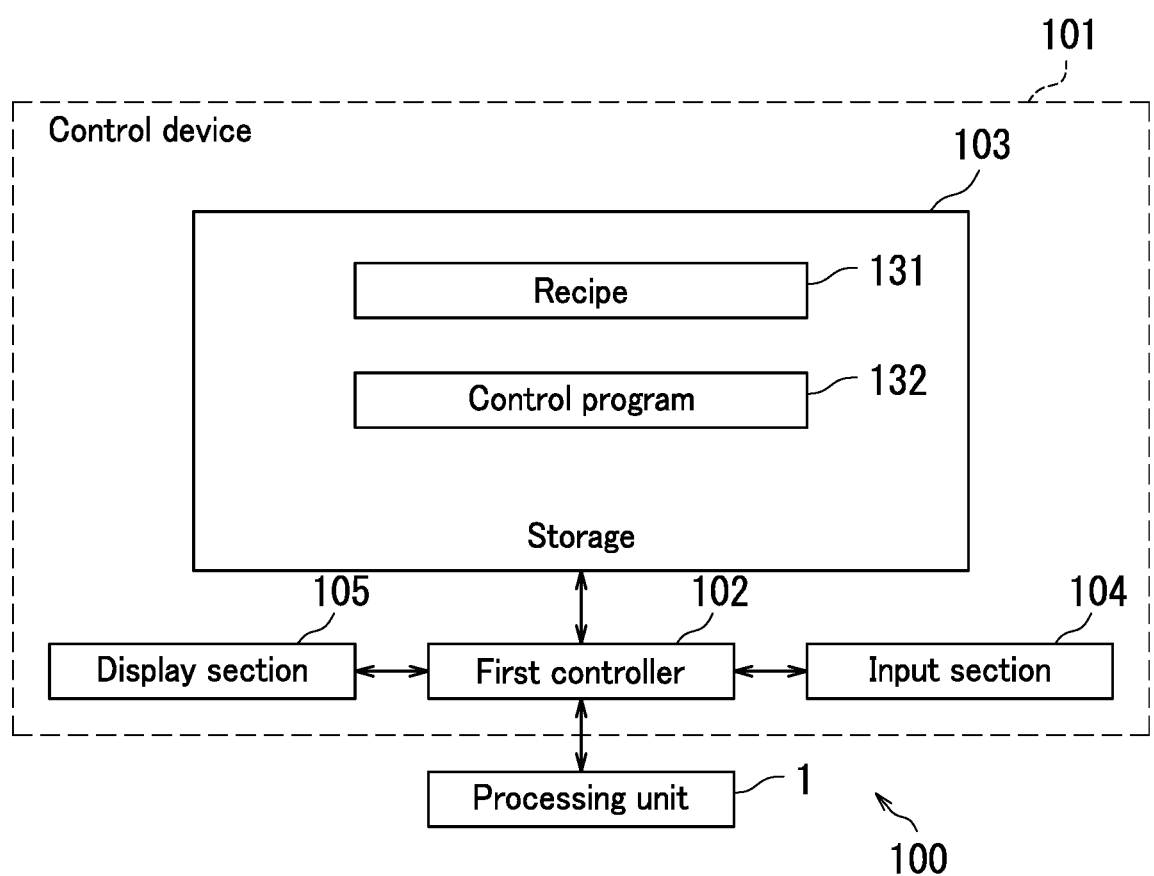
FIG. 9 is a block diagram of a control device in the first embodiment of the present disclosure.

The control device 101 will be described next with reference to FIG. 9. FIG. 9 is a block diagram of the control device 101 in the present embodiment. As illustrated in FIG. 9, the control device 101 includes a first controller 102, storage 103, an input section 104, and a display section 105.

The first controller 102 includes a processor. The first controller 102 includes a central processing unit (CPU) or a microprocessing unit (MPU), for example. Alternatively, the first controller 102 may include a general-purpose arithmetic unit or a dedicated arithmetic unit. The first controller 102 may further include a neural network processing unit (NPU).

The storage 103 stores data and computer programs therein. The storage 103 includes a main storage device. The main storage device is semiconductor memory, for example. The storage 103 may further include an auxiliary storage device. The auxiliary storage device is constituted by either or both semiconductor memory and a hard disk drive, for example. The storage 103 may include a removable medium. The first controller 102 controls operation of each element of the substrate processing apparatus 100 based on the data and the computer programs stored in the storage 103.

Specifically, the storage 103 stores a recipe 131 and a control program 132 therein. The recipe 131 defines processing details and processing procedures for a substrate W. Furthermore, the recipe 131 indicates processing conditions and various setting values.

The first controller 102 controls operation of each element of the substrate processing apparatus 100 based on the recipe 131 and the control program 132. In the present embodiment, the first controller 102 causes the display section 105 to display an image based on a plurality of estimation processing results which will be described later. Furthermore, the first controller 102 sets one processing condition corresponding to one estimation processing result of the estimation processing results as an actual processing condition in substrate processing on a substrate W.

The input section 104 receives input from the user and outputs information indicating an input result to the first controller 102. For example, the input section 104 receives selection of one processing condition corresponding to one estimation processing result of the later-described estimation processing results. The input section 104 further receives an input condition ranges within each of which a later-described specific processing condition is included, for example. The input section 104 further receives types of parameters as variables of a later-described distribution chart, for example. Note that the estimation processing results, the input condition ranges, and the distribution chart will be described later in detail. The input section 104 includes a touch panel and a pointing device, for example. The touch panel is disposed on the display surface of the display section 105, for example. The input section 104 and the display section 105 constitute a graphical user interface, for example.

The display section 105 displays various information. In the present embodiment, the display section 105 displays various setting screens (input screens), for example. The display section 105 further displays the distribution chart, for example. The display section 105 further displays a user-selectable selection area for selection of types of parameters as variables of the distribution chart, for example. The display section 105 further displays a plurality of marks that are user selectable on the distribution chart, for example. The marks include first marks and second marks different from the first marks. The display section 105 displays the first marks within a specific range of the distribution chart within which a point corresponding to a target processing result is included. The display section 105 displays the second marks outside the specific range in the distribution chart. That is, the marks include the first marks displayed within the specific range in the distribution chart within which a point corresponding to the target processing result is included and the second marks that are displayed outside the specific range in the distribution map and that are different from the first marks. Note that the user-selectable selection area and the marks will be described later in detail. The display section 105 includes a liquid-crystal display or an organic electroluminescent (EL) display, for example.

Figure 10:
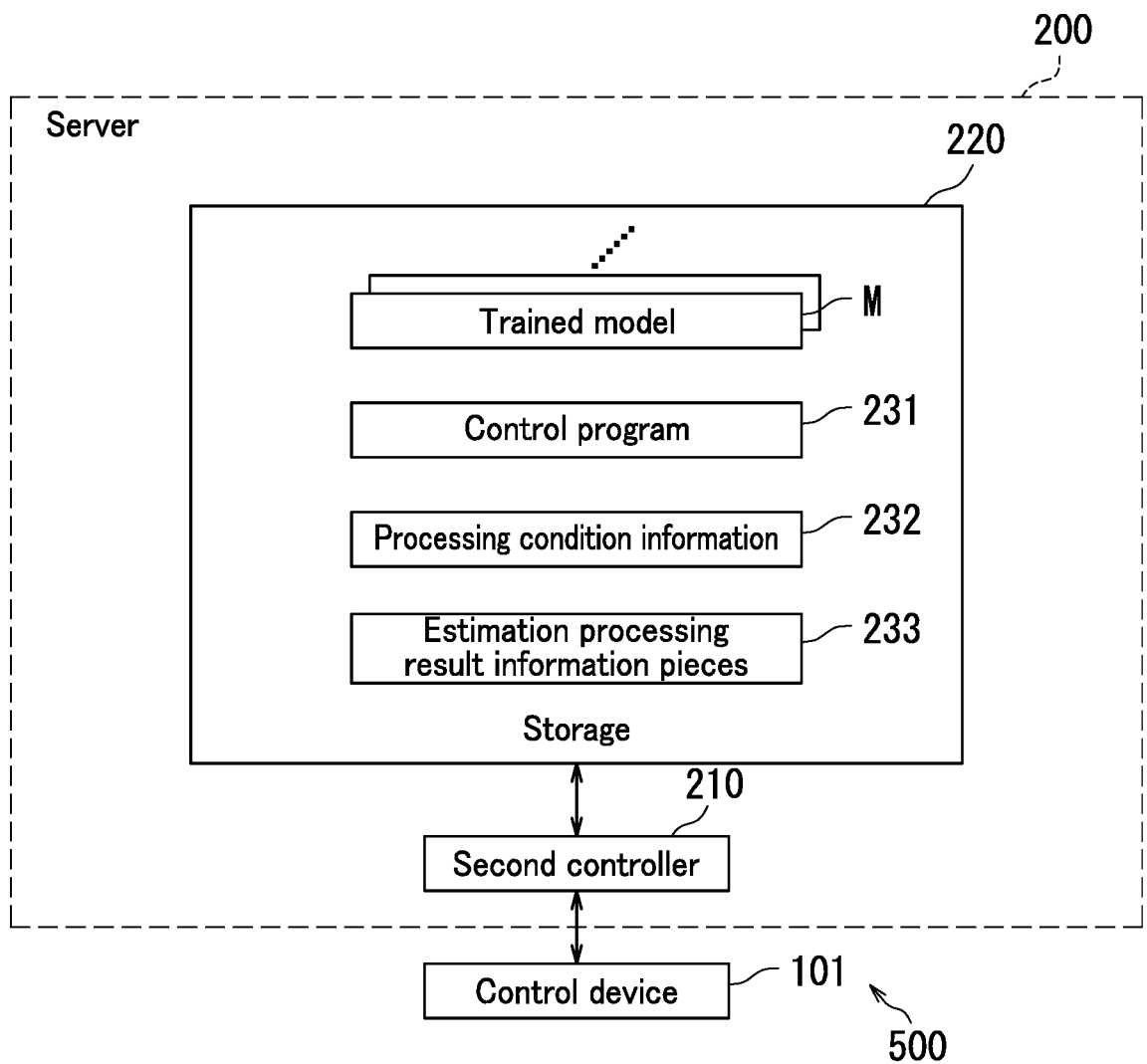
FIG. 10 is a block diagram of a server in the first embodiment of the present disclosure.

The server 200 will be described next with reference to FIG. 10. FIG. 10 is a block diagram of the server 200 in the present embodiment. As illustrated in FIG. 10, the server 200 includes a second controller 210 and storage 220. Note that the server 200 may further include an input section and a display section likewise the control device 101.

The second controller 210 includes a processor. The second controller 210 includes a CPU or a MPU, for example. Alternatively, the second controller 210 may include a general-purpose arithmetic unit or a dedicated arithmetic unit. The second controller 210 may further include a NPU.

The storage 220 stores data and computer programs therein. The storage 220 includes a main storage device. The main storage device is semiconductor memory, for example. The storage 220 may further include an auxiliary storage device. The auxiliary storage device is constituted by either or both semiconductor memory and a hard disk drive, for example. The storage 220 may include a removable medium. The second controller 210 controls operation of each element of the server 200 based on the data and the computer programs stored in the storage 220. Furthermore, the second controller 210 executes various arithmetic operation based on the data and the computer programs stored in the storage 220.

Specifically, the storage 220 stores a plurality of trained models M and a control program 231 therein. The trained models M are each provided for a combination of one type of the target TG and one type of the processing liquid (etching solution). The trained models M are generated in a later-described training device 900 (see FIG. 2), transmitted to the server 200, and then stored in the server 200.

The second controller 210 executes arithmetic operation based on the control program 231 and outputs estimation processing results to the control device 101. Specifically, the storage 220 stores processing condition information pieces 232 indicating processing conditions for a substrate W therein. The second controller 210 inputs a plurality of processing conditions to a trained model M to acquire a plurality of estimation processing results. The trained model M outputs the estimation processing results based on the processing conditions being input data. The storage 220 stores estimation processing result information pieces 233 indicating the estimation processing results. The second controller 210 outputs the estimation processing results to the control device 101.

The processing conditions each include at least a concentration condition, a temperature condition, a supply amount condition, a rotational speed condition, and a speed condition, for example. In other words, the processing conditions each include a plurality of parameters. Examples of the parameters include at least the concentration condition, the temperature condition, the supply amount condition, the rotational speed condition, and the speed condition. That is, the concentration condition, the temperature condition, the supply amount condition, the rotational speed condition, and the speed condition are types of the parameters. The concentration condition indicates a concentration of the processing liquid (etching solution) to be supplied to a substrate W. The temperature condition indicates a temperature of the processing liquid to be supplied to the substrate W. The supply amount condition indicates a supply amount by which the first nozzle 41 supplies the processing liquid to each point of the substrate W. The rotational speed condition indicates a rotational speed of the substrate W. The speed condition indicates points at which the first nozzle 41 is located and a speed of the first nozzle 41 at each point. Each of the processing conditions may include indication as to ejection or non-ejection of the processing liquid (e.g., pure water) toward the lower surface of the substrate W.

The processing conditions each include at least the concentration condition, the temperature condition, the supply amount condition, the rotational speed condition, and the speed condition as described above. The resultant estimation processing results can accordingly be highly accurate because many types of parameters are used for obtaining the estimation processing results.

The estimation processing results each are a processing result estimated to be obtained when a substrate W is processed with the processing liquid (etching solution) under a specific processing condition. The estimation processing results may each be a result directly estimated from a processing condition like a throughput profile, or may each be a result estimated from a processing condition and a target value like a difference between the throughput profile and a target throughput profile.

Each of the estimation processing results includes throughput uniformity or degree of throughput profile agreement, for example. The throughput uniformity refers to throughput uniformity across the surface of a substrate W. For example, in a case in which the throughput is constant regardless of points on the substrate W in the radial direction, the throughput uniformity can be said to be high. The degree of throughput profile agreement refers to a degree of agreement in each pint of the substrate W in the radial direction between the target throughput profile and a throughput profile obtained from a trained model M, and is calculated based on average throughput difference.

The storage 220 stores the estimation processing results obtained using a trained model M. The storage 220 stores each estimation processing result in association with a corresponding one of the processing conditions.

Figure 11:
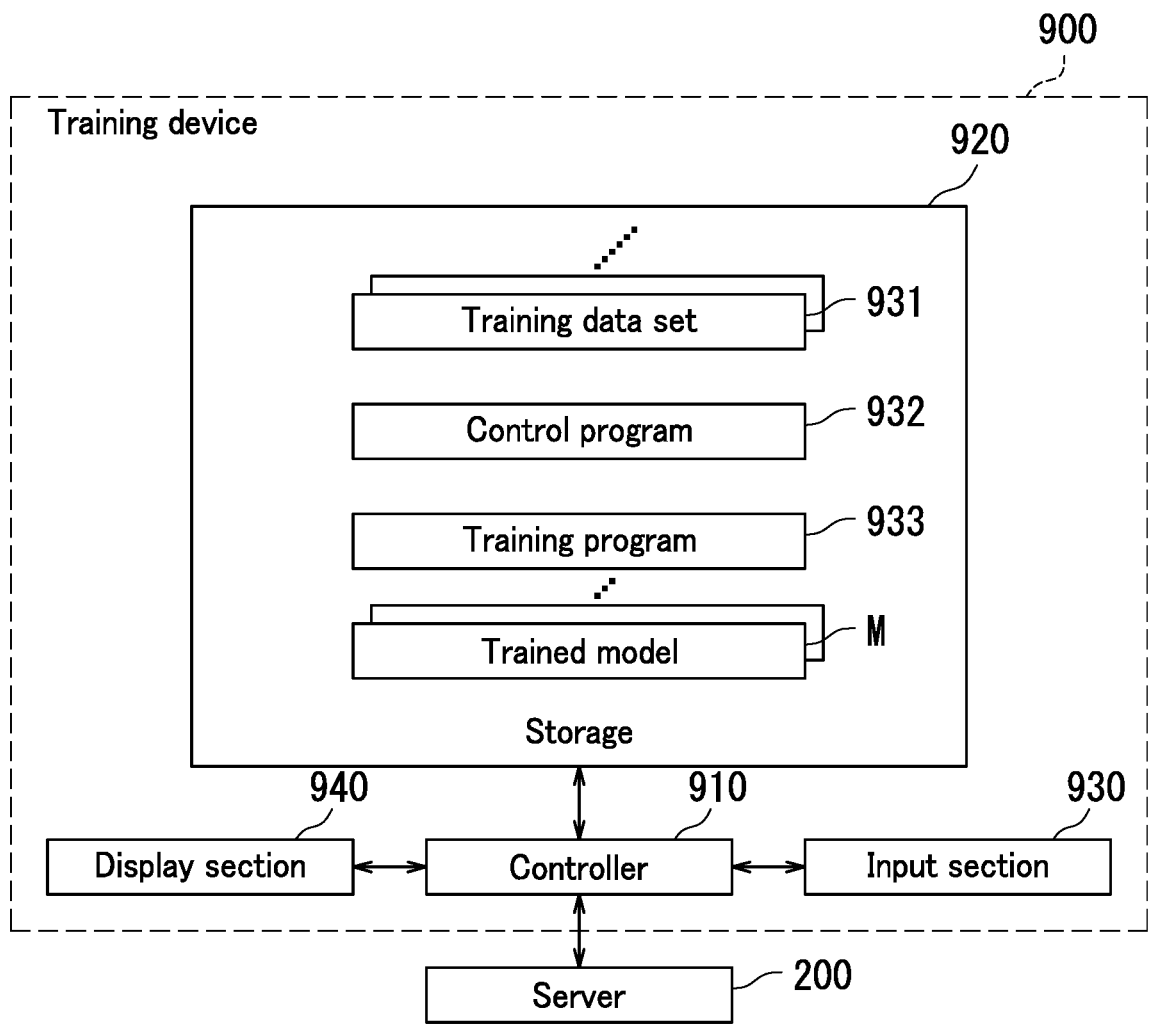
FIG. 11 is a block diagram of a training device in the first embodiment of the present disclosure.

The training device 900 (see FIG. 2) will be described next with reference to FIGS. 11 and 12. FIG. 11 is a block diagram of the training device 900 in the present embodiment. The training device 900 executes machine training. The machine training is any one of supervised training, unsupervised training, semi-supervised training, reinforcement training, and deep training, for example. As illustrated in FIG. 11, the training device 900 includes a controller 910, storage 920, an input section 930, and a display section 940.

The controller 910 includes a processor. The controller 910 includes a CPU or a MPU, for example. Alternatively, the controller 910 may include a general-purpose arithmetic unit or a dedicated arithmetic unit. The controller 910 may further include a NPU.

The storage 920 stores data and computer programs therein. The storage 920 includes a main storage device. The main storage device is semiconductor memory, for example. The storage 920 may further include an auxiliary storage device. The auxiliary storage device is constituted by either or both semiconductor memory and a hard disk drive, for example. The storage 920 may include a removable medium. The controller 910 controls operation of each element of the training device 900 based on the data and the computer programs stored in the storage 920. Furthermore, the controller 910 executes machine training based on the data and the computer programs stored in the storage 920.

Specifically, the storage 920 stores a training data set 931, a control program 932, a training program 933, and the trained models M therein.

FIG. 12 illustrates the training data set 931 in the present embodiment. As illustrated in FIG. 12, the training data set 931 includes information pieces #A1 to #An each indicating a training processing condition and information pieces DA1 to DAn each indicating a processing result of actual substrate processing on a substrate W under a corresponding one of the training processing conditions. Note that "n" represents a positive integer. The training processing conditions are associated with the respective processing results.

The training data set 931 is provided for each combination of a type of the target TG and a type of the processing liquid (etching solution). For example, in a case in which there are 10 combinations of a type of the target TG and a type of the processing liquid, there are 10 training data sets 931.

Note that a processing result of substrate processing on a substrate W under a training processing condition may include for example a processing result inflated by data expansion or a processing result based on simulation in addition to a processing result of actual substrate processing on the substrate W.

Each of the training processing conditions is a condition for processing a substrate W. In the present embodiment, the training processing conditions each include at least a concentration condition, a temperature condition, a supply amount condition, a rotational speed condition, and a speed condition, for example. In other words, the training processing conditions each include a plurality of parameters. Examples of the parameters include at least the concentration condition, the temperature condition, the supply amount condition, the rotational speed condition, and the speed condition. The concentration condition, the temperature condition, the supply amount condition, the rotational speed condition, and the speed condition each indicate a type of the parameter. The concentration condition indicates a concentration of the processing liquid to be supplied to the substrate W. The temperature condition indicates a temperature of the processing liquid to be supplied to the substrate W. The supply amount condition indicates a supply amount by which the first nozzle 41 supplies the processing liquid at each point of the substrate W. The rotational speed condition indicates a rotational speed of the substrate W. The speed condition indicates points of the first nozzle 41 and a speed of the first nozzle 41 at each point. Each of the training processing conditions may include indication as to ejection or non-ejection of the processing liquid toward the lower surface of the substrate W. Note that ejection or non-ejection of the processing liquid (e.g., pure water) toward the lower surface of the substrate W affects the temperature of the substrate W.

As illustrated in FIG. 11, the controller 910 generates the trained models M that are subjected to machine training based on the training data set 931 using the training program 933. One trained model M is generated using one training data set 931. The training program 933 is a program for finding a given rule from the training data set 931 and for executing algorithm that generates a model (trained model) expressing the rule.

Typically, the trained models M are each constituted using a high-dimensional function. In the present embodiment, the controller 910 may perform dimensional reduction processing on the trained models M. That is, the trained models M in the present embodiment may be constituted using a low-dimensional function. When each of the trained models M is constituted as above, the calculation time for acquiring the estimation processing results using the trained model M can be reduced. For example, it is possible to reduce the operation time that would have taken tens of hours to a few seconds.

The controller 910 causes the storage 920 to store the generated trained models M. Furthermore, the controller 910 transmits the trained models M to the setting system 500 (the server 200 herein).

The input section 930 receives input from the user. For example, the input section 930 receives a machine training execution instruction. The input section 930 includes a touch panel and a pointing device, for example. The touch panel is disposed on the display surface of the display section 940, for example. The input section 930 and the display section 940 constitute a graphical user interface, for example.

The display section 940 displays various information. In the present embodiment, the display section 940 displays various error screens and various setting screens (input screens), for example. The display section 940 includes a liquid-crystal display or an organic EL display, for example.

Figure 13:
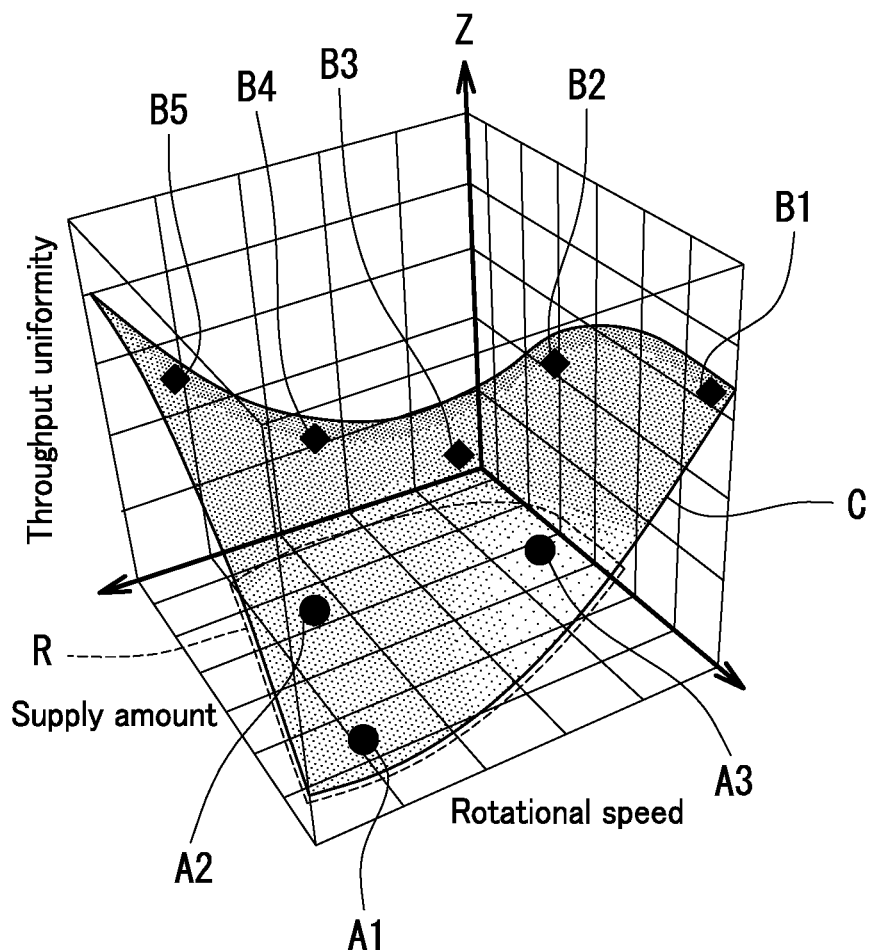
FIG. 13 is a diagram illustrating an example of an image displayed on a display section in the first embodiment of the present disclosure.

With reference to FIG. 13, an image that the display section 105 of the control device 101 displays will be described next. FIG. 13 is a diagram illustrating an example of the image displayed on the display section 105 in the present embodiment. Here, an image based on a plurality of estimation processing results will be described in detail.

As illustrated in FIG. 13, the display section 105 of the control device 101 displays an image based on the estimation processing results. The image includes the estimation processing results transmitted from the server 200 and processing conditions corresponding to the estimation processing results. That is, the estimation processing results are displayed in association with the processing conditions in the image.

The image displayed on the display section 105 includes a distribution chart in the present embodiment. The distribution chart is displayed using one or more types of parameters and the estimation processing results. In other words, the distribution chart is displayed using one or more types of parameters and the estimation processing results each as a variable. Note that the display section 105 may display a graph or a table rather than the distribution chart.

The distribution chart is displayed three-dimensionally using two types of parameters and the estimation processing results in the present embodiment. Note that the parameters as variables of the distribution chart are selected by the user as will be described later in detail. Alternatively, the distribution chart may be displayed using one type of parameter and the estimation processing results or displayed using three or more types of the parameters and the estimation processing results.

The image displayed on the display section 105 includes a curved response surface C in the present embodiment. The curved response surface C is obtained from values at respective points (see black circle marks and black square marks in FIG. 13) in the distribution chart. The curved response surface C may be generated by interpolation between points in the distribution chart or generated by an approximate function generated based on points in the distribution chart. Note that the display section 105 displays both the distribution chart and the curved response surface C in the present embodiment, but may display only one of the distribution chart and the curved response surface C.

The distribution chart displayed on the display section 105 will be described next in detail with further reference to FIG. 13. The distribution chart is displayed using the "rotational speed" and the "supply amount" as the two types of parameters and the "throughput uniformity" as the estimation processing results. Note that the value in the z axial direction decreases as the "throughput uniformity" is increased in the distribution chart in FIG. 13.

The "rotational speed", the "supply amount", and the "throughput uniformity" are set by the user as the variables of the distribution chart. When the user re-selects the variables of the distribution chart, the display section 105 displays a distribution chart and a curved response surface C based on the newly selected variables. No particular limitations are placed on the combination of the two types of parameters, and examples of the combination include a combination of the "rotational speed" and the "supply amount", a combination of the "supply amount" and the "processing liquid concentration", a combination of the "supply amount" and the "ejection or non-ejection of the processing liquid toward the lower surface of the substrate W", a combination of the "rotational speed" and the "processing liquid temperature", a combination of the "rotational speed" and the "ejection or non-ejection of the processing liquid toward the lower surface of the substrate W", and a combination of the "ejection or non-ejection of the processing liquid toward the lower surface of the substrate W" and the "processing liquid temperature".

Furthermore, the distribution chart and the curved response surface C only in a range where the estimation processing results are equal to or greater than a specific threshold value in FIG. 13. Note that the display range of the distribution chart and the curved response surface C is set as appropriate. The distribution chart and the curved response surface C may be displayed only in a range where the estimation processing results are less than the specific threshold value or within a specific range (at least a first threshold value and less than a second threshold value). Alternatively, the distribution chart and the curved response surface C may be displayed in the entire range regardless of the values of the estimation processing results.

In a case in which the "rotational speed", the "supply amount", and the "throughput uniformity" are set as the variables of the distribution chart, for example, the same number of estimation processing results (also referred to below as the same number of estimation processing results as the number of combinations) are obtained as the number of combinations of parameters (e.g., "processing liquid concentration", "processing liquid temperature", and "ejection or non-ejection of the processing liquid toward the lower surface of the substrate W") other than the "rotational speed" and the "supply amount" among the parameters as the processing conditions. That is, the same number of estimation processing results as the number of the above combinations can be obtained for one combination of a given value of the "rotational speed" and a given value of the "supply amount". Therefore, in the present embodiment, the first controller 102 calculates an average of the same number of estimation processing results as the number of combinations to acquire one estimation processing result for one combination of the given value of the "rotational speed" and the given value of the "supply amount". Note that the method for acquiring one estimation processing result for one combination of the "rotational speed" and the "supply amount" is not limited to the above method. For example, it is possible that a specific number of estimation processing results close to the target processing result are extracted from among the same number of estimation processing results as the number of combinations and the average of the specific number of the estimation processing results is acquired as the one estimation processing result. Alternatively, for example, it is possible that estimation processing results within a specific range within which the target processing result is included are extracted from among the same number of estimation processing results as the number of combinations and the average of the estimation processing results within the specific range is acquired as the one estimation processing result. Note that the present embodiment exemplifies a case in which one estimation processing result is acquired through averaging at least some of the same number of estimation processing results as the number of combinations and the acquired result is displayed, which should not be taken to limit the present disclosure. For example, some or all of the same number of estimation processing results as the number of combinations may be displayed.

The distribution chart and the curved response surface C represent degree of influence of the parameters on the estimation processing results. Specifically, with respect to points A1 and A3 in FIG. 13, for example, the amount of change in throughput uniformity around the point A1 when changing the values of the parameters is relatively small while the amount of change in throughput uniformity around the point A3 when changing the values of the parameters (particularly, the rotational speed) are changed is relatively large. That is, it can be considered that when a substrate W is processed under a processing condition corresponding to the point A1, the "throughput uniformity" is ensured even if the "rotational speed" and the "supply amount" vary to some extent. Note that the amount of change in throughput uniformity can be read from an inclination of the curved response surface C. Furthermore, the inclination of the curved response surface C at the position of a later-described mark may be displayed in association with the mark. Selection of a mark by the user may cause display of the inclination of the curved response surface C at the position of the mark. Note that the inclination of the curved response surface C is calculated once the distribution chart and the curved response surface C are displayed as in FIG. 13 in the present embodiment, which should not be taken to be a limitation. For example, it is possible that a plurality of processing conditions within an input condition range within which a specific processing condition is included are input to acquire a plurality of estimation processing results and then the inclination at a specific point is calculated.

The display section 105 further displays a plurality of marks that are user selectable on the distribution chart. In other words, the distribution chart includes user-selectable marks. The marks include first marks and second marks different from the first marks. In FIG. 13, the first marks are indicated by black circles and the second marks are indicated by black squares. The first marks correspond to the points A1 to A3 and the second marks correspond to the points B1 to B5.

The display section 105 displays the first marks (points A1 to A3) in a specific range R in the distribution chart within which a point corresponding to the target processing result is included. The display section 105 displays the second marks (points B1 to B5) outside the specific range R in the distribution chart. The target processing result may be the throughput average, the throughput uniformity, or the degree of throughput profile agreement. In the present embodiment, the specific range R is a lower range in the distribution chart in FIG. 13. That is, the first marks (points A1 to A3) correspond to processing conditions under which processing results closer to the target processing result can be obtained than under the processing conditions corresponding to the second marks (points B1 to B5). Note that although three first marks and five second marks are indicated in FIG. 13, the respective numbers of the first marks and the second marks are not limited specifically. For example, about 10 first marks and about 20 second marks may be displayed. For example, processing conditions corresponding to top few processing results close to the target processing result may be indicated as the first marks.

The display section 105 displays the first marks (points A1 to A3) in the specific range R in the distribution chart within which a point corresponding to the target processing result is included as described above. The display section 105 displays the second marks (points B1 to B5) outside the specific range R in the distribution chart. Accordingly, the user can easily select a processing condition under which a processing result close to the target processing result can be obtained.

Figure 14:
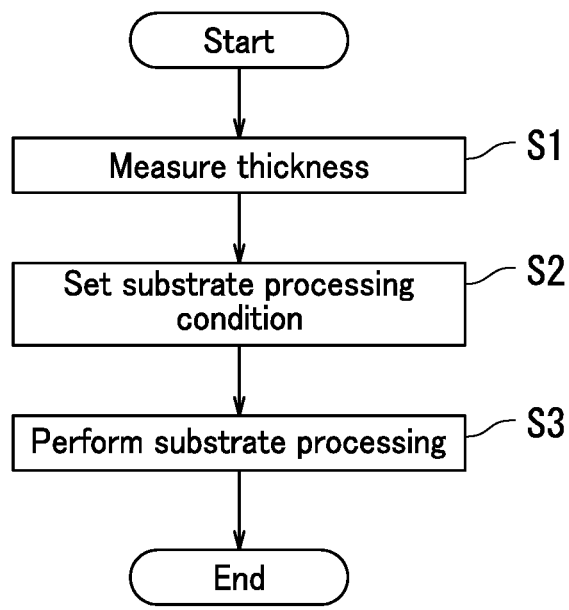
FIG. 14 is a flowchart depicting a substrate processing method using the substrate processing system according to the first embodiment of the present disclosure.

With reference to FIGS. 14 to 19, a substrate processing method using the substrate processing system 1000 will be described next. FIG. 14 is a flowchart depicting the substrate processing method using the substrate processing system 1000 in the present embodiment.

As depicted in FIG. 14, the substrate processing method using the substrate processing system 1000 includes at least Steps S2 and S3. In the present embodiment, the substrate processing method includes Steps S1 to S3.

Step S1 includes measuring the thickness of the target TG before processing. Step S2 includes setting a substrate processing condition. Step S3 includes performing substrate processing on a substrate W. Note that processing on the substrate W in Steps S1 to S3 is etching processing. The following describes Steps S1 to S3 in detail.

Figure 15:
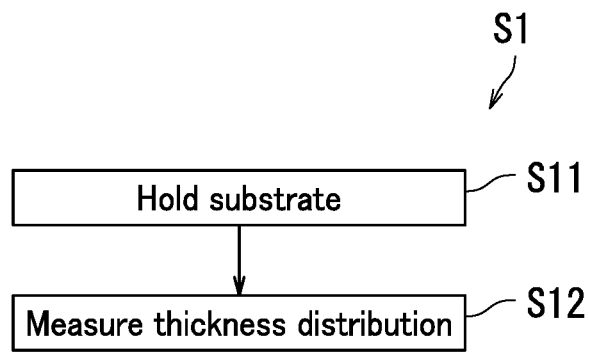
FIG. 15 is a flowchart depicting a method for measuring the thickness of a target before processing in the first embodiment of the present disclosure.

First, the measuring the thickness of the target TG before processing (Step S1) will be described with reference to FIG. 15. FIG. 15 is a flowchart depicting a method for measuring the thickness of the target TG before processing in the present embodiment. The measuring the thickness of the target TG before processing includes Steps S11 and S12.

The processing depicted in FIG. 15 starts upon the user operating the input section 104. At that time, a plurality of substrates W are accommodated in at least one of the load ports LP.

The first controller 102 controls the indexer robot IR and the center robot CR to transport a substrate W into the chamber 2 of one of the processing units 1. The first controller 102 causes the spin chuck 3 to hold the substrate W transported in the chamber 2 (Step S11).

Once the substrate W is held by the spin chuck 3, the first controller 102 causes the measurement section 8 to measure a thickness distribution of the target TG included in the substrate W (Step S12). The thickness distribution of the target TG measured herein indicates a thickness distribution of the target TB before processing.

Based on the thickness distribution of the target TG obtained through Steps S11 and S12 and a target surface profile of the substrate W, a target throughput profile can be attained.

Figure 16:
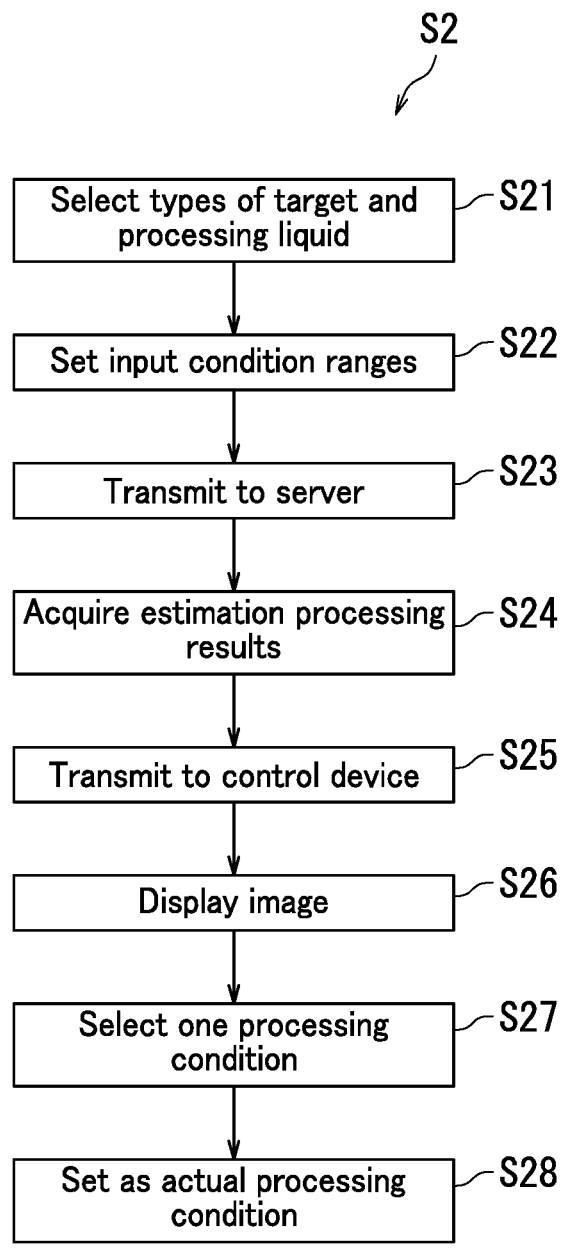
FIG. 16 is a flowchart depicting a substrate processing condition setting method according to the first embodiment of the present disclosure.

The setting a substrate processing condition (Step S2) will be described next with reference to FIGS. 16 to 18. FIG. 16 is a flowchart depicting a method for setting a substrate processing condition in the present embodiment. The setting a substrate processing condition includes Steps S24, S26, and S28. In the present embodiment, the setting a substrate processing condition includes Steps S21 to S28.

As depicted in FIG. 16, the user operates the input section 104 to select a type of the target TG and a type of the processing liquid (etching solution) in Step S21. Through the above, the type of the target TG and the type of the processing liquid are set by the first controller 102.

Figure 17:
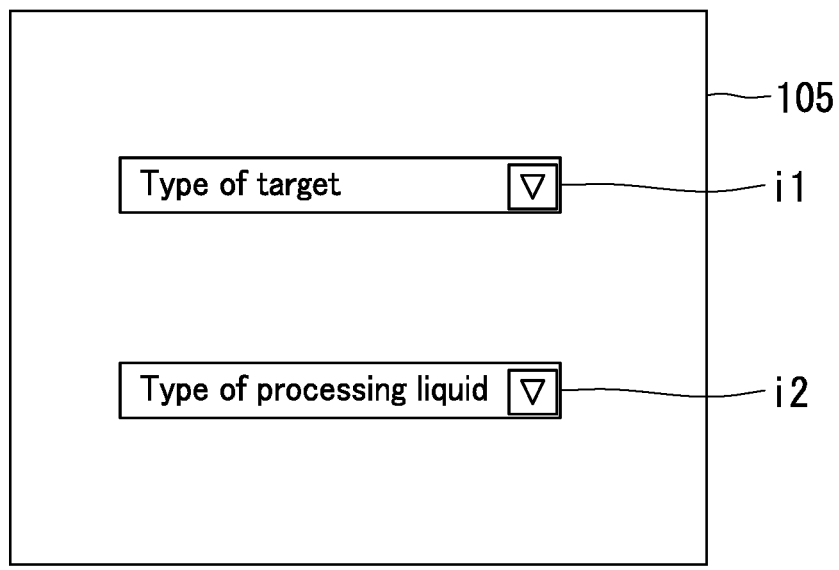
FIG. 17 is a diagram illustrating an example of an image displayed on the display section in the first embodiment of the present disclosure.

FIG. 17 is a diagram illustrating an example of an image displayed on the display section 105 in the present embodiment. Specifically, as illustrated in FIG. 17, the display section 105 displays for example a pull-down menu i1 for selecting a type of the target TG and a pull-down menu i2 for selecting a type of the processing liquid in Step 21. The user operates the input section 104 to select a type of the target TG in the pull-down menu i1 and a type of the processing liquid in the pull-down menu i2. Note that the user may input a type of the target TG and a type of the processing liquid using a keyboard or the like rather than the pull-down menu i1 and the pull-down menu i2. Alternatively, the user may input the lot number or the like of the substrate W to cause the first controller 102 to set a type of the target TG and a type of the processing liquid based on the lot number or the like of the substrate W.

In Step S22 depicted in FIG. 16, for example, the user operates the input section 104 to set input condition ranges. The input condition ranges refer to ranges of processing conditions to be input to a trained model 23 in Step S24 later.

Within each of the input condition ranges, a specific processing condition. The specific processing condition may be a processing condition under which processing has been performed in the past with the type of the target TG and the type of the processing liquid selected by the user, for example. Alternatively, the specific processing condition may be a processing condition determined based on user's past experience.

The input condition ranges each are set for a corresponding one of the parameters of the processing conditions. The input condition ranges of the parameters may each be set within a specific range around the median of the values of a corresponding specific processing condition. Alternatively, the input condition ranges may be set by the first controller 102 as a result of user input or may be automatically set based on the specific processing condition by the first controller 102.

Figure 18:
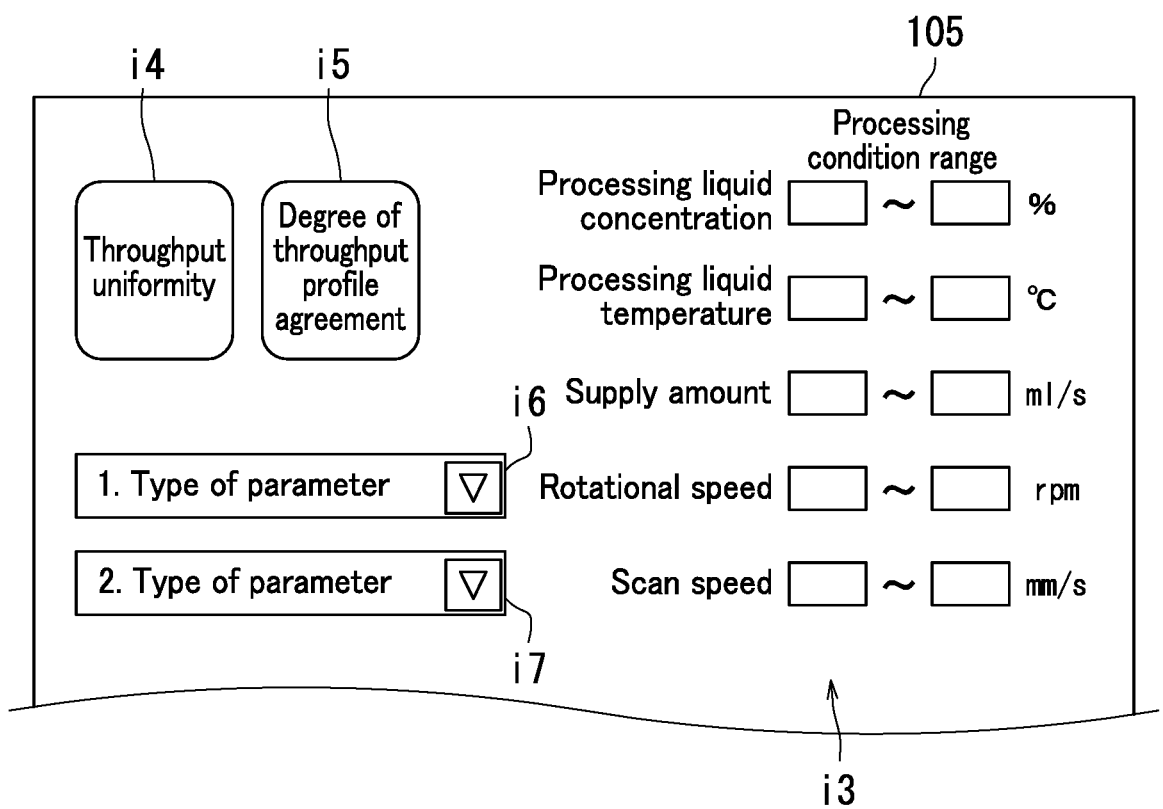
FIG. 18 is a diagram illustrating an example of an image displayed on the display section in the first embodiment of the present disclosure.

FIG. 18 illustrates an example of an image displayed on the display section 105 in the present embodiment. Specifically, in Step S22, the display section 105 displays an input area i3 to which a lower limit and an upper limit of the input condition range of each parameter are to be input as illustrated in FIG. 18, for example. For example, the user inputs numerical values in the input area i3 through the input section 104.

In Step S23, information on the type of the target TG, information on the type of the processing liquid, and input condition range information are transmitted from the control device 101 to the server 200. The information on the type of the target TG is information indicating a type of the target TG. The information on the type of the processing liquid is information indicating a type of the processing liquid. The input condition range information is information indicating the input condition ranges.

In Step S24, the second controller 210 inputs a plurality of processing conditions to a trained model 23 to acquire a plurality of estimation processing results. The processing conditions input to the trained model 23 each are a processing condition within a corresponding one of the input condition ranges.

Specifically, in Step S24, the second controller 210 selects one of a plurality of trained models 23 based on the information on the type of the target TG and the information on the type of the processing liquid. That is, the second controller 210 selects one trained model 23 corresponding to the type of the target TG and the type of the processing liquid that are selected in Step S21.

The second controller 210 then inputs processing conditions within the input condition ranges to the selected trained model 23 to acquire estimation processing results. In doing so, the second controller 210 acquires estimation processing results through loop operation, for example. Specifically, each parameter includes several to several tens of values to be input. The values to be input ranges from a lower limit value to an upper limit value in the input condition range of each parameter. A value for the parameter of the processing liquid temperature is set, for example, every few degrees Celsius, every 5 degrees Celsius, or every 10 degrees Celsius. This makes the number of combinations of the to-be-input values of each parameter within the input condition range hundreds to thousands, for example. The same number of processing conditions as the number of combinations are input to the trained model 23, thereby acquiring the same number of estimation processing results. The acquired estimation processing results are stored in the storage 220.

In Step S25, estimation processing result information pieces are transmitted from the server 200 to the control device 101. The estimation processing result information pieces are transmitted from the server 200 to the control device 101 in association with the corresponding processing condition information pieces.

In Step S26, the first controller 102 causes the display section 105 to display an image based on the estimation processing results. Specifically, as illustrated in FIG. 18, the display section 105 displays a button i4 and a button i5. The button i4 is for selection of the "throughput uniformity" as a variable of the distribution chart. The button i5 is for selection of the "degree of throughput profile agreement" as a variable of the distribution chart. The user clicks the button i4 or the button i5 to select the "throughput uniformity" or the "degree of throughput profile agreement".

The display section 105 also displays a pull-down menu i6 and a pull-down menu i7 for selection of types of parameters as variables of the distribution chart. The user selects types of the parameters as variables of the distribution chart through the pull-down menus i6 and i7. Note that the pull-down menus i6 and i7 each are an example of a "selection area" in the present disclosure.

Thereafter, the first controller 102 causes the display section 105 to display a three-dimensional distribution chart (see FIG. 13) using the variables selected by the user.

Note that the user may change any variables of the distribution chart after the distribution chart is displayed. Through variable change, the user can recognize a plurality of distribution charts using different variables.

The display section 105 further displays user-selectable marks (first marks and second marks) on the distribution chart.

In Step S27, the user selects one of the processing conditions that corresponds to one of the estimation processing results through the input section 104. Specifically, the user selects one of the first marks (points A1 to A3) on the distribution chart displayed on the display section 105. In other words, the user selects one of the processing conditions that corresponds to one of the first marks (the points A1 to A3) as an actual processing condition. For example, when one (point A1) of the first marks in FIG. 13 is selected, the supply amount of the processing liquid can be reduced and throughput uniformity can be ensured even if the rotational speed varies.

In Step S28, the first controller 102 sets one of the processing conditions that corresponds to one mark selected by the user as an actual processing condition.

Through the above, the substrate processing condition is set.

Although the input condition ranges are defined by setting the input condition ranges through the user operating the input section 104, which should not be taken to be a limitation. For example, it is possible that each input condition range may be set based on an optimization algorithm such as Bayesian optimization through selection of a variable of the distribution chart by clicking the button i4 or i5 in FIG. 18. This eliminates a bother of input condition range setting and improves usability.

The method for setting a substrate processing condition has been described so far with reference to FIGS. 16 to 18. As described above, in the present embodiment, the second controller 210 acquires a plurality of estimation processing results by inputting a plurality of processing conditions to a trained model M (Step S24). The first controller 102 then causes the display section 105 to display an image based on the estimation processing results (Step S26). Furthermore, the first controller 102 sets one processing condition corresponding to one of the estimation processing results as an actual processing condition for substrate processing on a substrate W (Step S28). Therefore, the user can easily recognize how estimation processing results change by changing a parameter of a processing condition. Thus, a processing condition suitable for mass production can be set as an actual processing condition. Specifically, for example, a substrate W can be processed under a processing condition with a wide process window, thereby achieving stable substrate processing on the substrate W. Furthermore, for example, the amount of the processing liquid (etching solution) used in substrate processing on the substrate W can be reduced.

In addition, the second controller 210 inputs a plurality of processing conditions within the input condition ranges to the trained model M to acquire a plurality of estimation processing results (Step S24). Accordingly, the number of processing conditions input to the trained model M can be significantly reduced compared with the case in which processing conditions outside the input condition range are also input to the trained model M. Thus, an increase in calculation time by the second controller 211 can be significantly suppressed in acquisition of the estimation processing results. In particular, in a case in which there are many types of parameters of the processing conditions, the number of the processing conditions increases exponentially. Therefore, setting of the ranges of to-be-input processing conditions is especially effective.

As described above, the user selects one of the processing conditions through the input section 104 based on the image displayed on the display section 105 (Step S27). The first controller 102 then sets the selected one processing condition as an actual processing condition (Step S28). Accordingly, the substrate W can be processed under a desired processing condition such as a processing condition with a wide process window or a processing condition under which the amount of the processing liquid used can be reduced, for example.

As described above, the first controller 102 causes the display section 105 to display the distribution chart three-dimensionally using two types of parameters and the estimation processing results that are specified by the user. Accordingly, this makes it easier to visually recognize the degree of influence (e.g., the amount of change in throughput uniformity) of the parameters on the estimation processing results than in a case in which two-dimensional distribution chart is displayed.

As described above, the display section 105 displays types of the parameters as variables of the distribution chart in the user-selectable selection area (pull-down menus i6 and i7 herein). This makes it easy to select types of the parameters as variables of the distribution chart, thereby enabling easy recognition of a processing condition suitable for mass production.

The display section 105 displays user-selectable marks on the distribution chart as described above. One of the marks is selected by the user operating the input section 104 (Step S27). The first controller 102 then sets one processing condition corresponding to the mark selected by the user as an actual processing condition (step S28). Therefore, as a result of the user selecting a mark located on the distribution chart while visually checking the distribution chart, a processing condition corresponding to the selected point can be selected as an actual processing condition. Thus, user confirmation and selection work can be facilitated.

Figure 19:
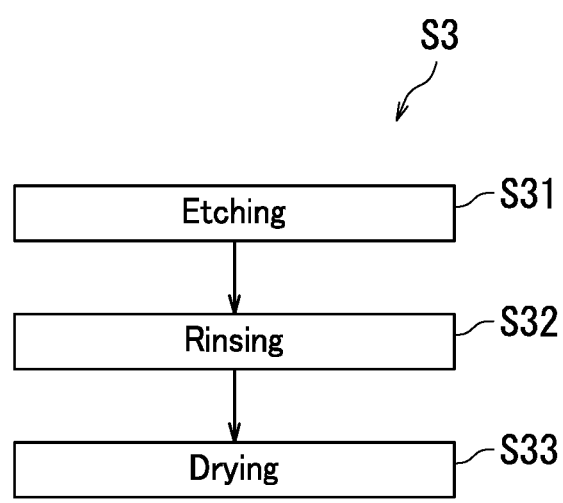
FIG. 19 is a flowchart depicting a substrate processing method according to the first embodiment of the present disclosure.

The performing substrate processing on a substrate W (Step S3) will be described next with reference to FIG. 19. FIG. 19 is a flowchart depicting a method for performing substrate processing on a substrate W according to the present embodiment. The performing substrate processing on a substrate W includes Steps S31 to S33.

As depicted in FIG. 19, the first controller 102 causes the spin motor section 5 to rotate the substrate W held by the spin chuck 3 in Step S31. The first controller 102 then controls the nozzle moving mechanism 6 and the etching solution supply section 4 so that the processing liquid (etching solution) is supplied to the substrate W from the first nozzle 41. As a result, the substrate W is etched.

In Step S32, the first controller 102 controls the rinse liquid supply section 7 to supply the rinse liquid to the substrate W, thereby removing the processing liquid (etching solution) from the substrate W. Specifically, the processing liquid is pushed outward of the substrate W by the rinse liquid to be drained out of the substrate W. As a result, a liquid film of the processing liquid on the substrate W is replaced with a liquid film of the rinse liquid.

In Step S33, the first controller 102 controls the spin motor section 5 to dry the substrate W.

Through the above, the processing on the substrate W ends.

Second Embodiment

Figure 20:
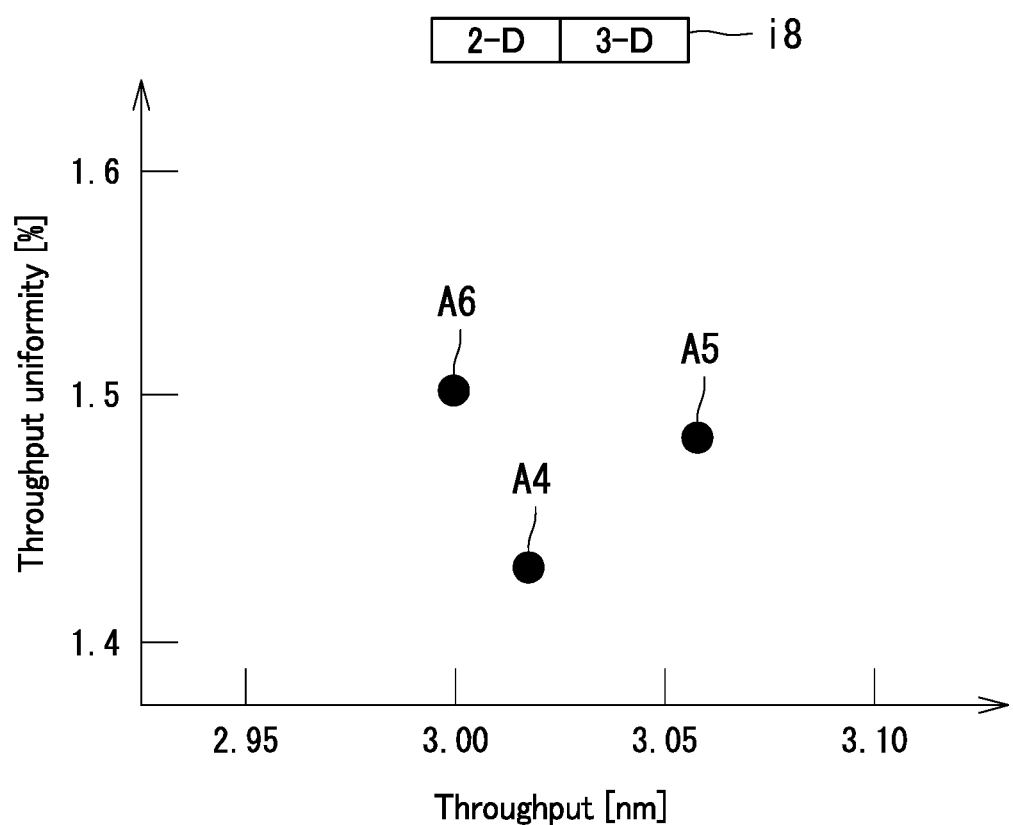
FIG. 20 is a diagram illustrating an example of an image displayed on the display section in a second embodiment of the present disclosure.

The following describes a substrate processing system 1000 according to a second embodiment of the present disclosure with reference to FIG. 20. FIG. 20 illustrates an example of an image displayed on a display section 105 in the second embodiment of the present disclosure. The second embodiment describes an example of a distribution chart displayed two-dimensionally unlike the first embodiment.

As illustrated in FIG. 20, a distribution chart is displayed two-dimensionally. The distribution chart is displayed using the "throughput" and the "throughput uniformity" as variables, for example. No particular limitations are placed on the variables of the distribution chart and parameters of processing conditions may be used likewise in the first embodiment.

The display section 105 in the present embodiment displays a button i8 for switching the dimension of the distribution chart between 2-D and 3-D. When the user clicks the button i8 through the input section 104, the display section 105 displays a two-dimensional distribution chart or a three-dimensional distribution chart.

The display section 105 also displays marks that are user selectable on the distribution chart. The marks include three first marks (points A4 to A6) in the present embodiment. For example, the user attaching importance to throughput uniformity selects a processing condition corresponding to the point A4. Alternatively, the user attaching importance to the target throughput (e.g., 3.05 nm) selects a processing condition corresponding to the point A5, for example.

In the present embodiment, the distribution chart is displayed using variables ("throughput" and "throughput uniformity" herein) based on the estimation processing results as illustrated in FIG. 20, for example, rather than the parameters of the processing conditions. This makes it easy for the user attaching importance to the target processing result to select a processing condition.

The configuration of the other elements, the substrate processing method, and effects other than those described above in the second embodiment are the same as those in the first embodiment.

Embodiments of the present disclosure have been described so far with reference to drawings. However, the present disclosure is not limited to the above embodiments and can be practiced within a scope not deviating from the gist of the present disclosure with alterations made as appropriate. Elements of configuration disclosed in the above embodiments are altered as appropriate. For example, some of all the elements of configuration in an embodiment may be added to another embodiment or removed from the embodiment.

The drawings schematically illustrate elements of configuration in order to facilitate understanding of the present disclosure. Properties such as thickness, length, intervals, and the number of each element of configuration illustrated in the drawings may differ from actual properties in order to facilitate preparation of the drawings. Furthermore, each element of configuration indicated in the above embodiments is an example and not a particular limitation. Various alterations may be made so long as there is no substantial deviation from the effects of the present disclosure.

For example, each of the substrates W in the first and second embodiments is, but is not limited to, a semiconductor wafer. For example, the substrate W may be a substrate for liquid crystal display device use, a substrate for field emission display (FED) use, a substrate for optical disk use, a substrate for magnetic disk use, a substrate for magneto-optical disk use, a substrate for photomask use, a ceramic substrate, or a substrate for solar cell use.

The first controller 102 and the second controller 210 are disposed in different devices in the first and second embodiments, which should not be taken to limit the present disclosure. They may be disposed in the same single device. For example, the first controller 102 and the second controller 210 may be disposed in the control device 101. Alternatively, the first controller 102 and the second controller 210 may constitute a single controller.

The first and second embodiments describe an example in which after the user selects a type of the target TG and a type of the processing liquid (step S21) and sets input condition ranges (Step S22), the second controller 210 inputs a plurality of processing conditions to a trained model M to acquire a plurality of estimation processing results (Step S24), which should not be taken to limit the present disclosure. For example, the second controller 210 may pre-input a plurality of processing conditions to the trained model M for pre-acquisition of a plurality of estimation processing results. Thereafter, an image may be displayed based on the type of the target TG and the type of the processing liquid selected by the user and the pre-acquired estimation processing results. That is, arithmetic operation using the trained model M may have been completed at a time when the user selects a type of the target TG and a type of the processing liquid. In the above configuration, the image is further quickly displayed to the user, thereby reducing the time required for substrate processing. In a case in which the second controller 210 pre-acquires a plurality of estimation processing results, it is preferable to acquire the estimation processing results through input of much more processing conditions to the trained model M. Furthermore, the estimation processing results are preferably acquired by inputting all possible processing conditions to the trained model M, for example.

The first and second embodiments describe an example in which a plurality of estimation processing results acquired using the trained model M are transmitted from the server 200 to the control device 101, which should not be taken to limit the present disclosure. For example, it is possible that each time the user inputs information (e.g., information on a selected parameter) through the input section 104, the input information is transmitted from the control device 101 to the server 200, distribution chart information for displaying a distribution chart is generated in the server 200, and the generated distribution chart information is transmitted from the server 200 to the control device 101.

The first and second embodiments describe an example in which the training device 900 is provided separately from the server 200 and the control device 101, which should not be taken to limit the present disclosure. For example, the server 200 or the control device 101 may serve also as the training device 900.

The first and second embodiments describe an example in which the control device 101 is included in the substrate processing apparatus 100, which should not be taken to limit the present disclosure. For example, the control device 101 may be provided separately from the substrate processing apparatus 100. In the above configuration, information on the actual processing condition may be transmitted from the control device 101 to the substrate processing apparatus 100.

The first and second embodiments describe an example in which the specific processing condition within an input condition range may be a processing condition under which processing has been performed in the past or a processing condition determined based on the user's past experience, which should not be taken to limit the present disclosure. For example, it is possible that a trained model that outputs a specific processing condition upon receiving the target throughput profile is generated through machine training using the training data set 931 to acquire a specific processing condition using the trained model.

The first embodiment describes an example in which two types of parameters of the processing conditions are used as variables of the three-dimensional distribution chart, which should not be taken to limit the present disclosure. Two or more variables based on the estimation processing results may be displayed as variables of the three-dimensional distribution chart likewise in the second embodiment.

The second embodiment describes an example in which a two-dimensional distribution chart and a three-dimensional distribution chart are displayed in a switchable manner, which should not be taken to limit the present disclosure. For example, the display section 105 may display only one of the two-dimensional distribution chart and the three-dimensional distribution chart.

The first and second embodiments describe an example in which the user selects one of the first marks displayed on the display section 105, which should not be taken to limit the present disclosure. For example, it is possible that the display section 105 displays one first mark of the first marks as a candidate for the actual processing condition for user approval or disapproval. In this case as well, it goes without saying that the user will select one processing condition.

Furthermore, although it is the etching processing that the substrate processing apparatus 100 executes in the first and second embodiments, the processing that the substrate processing apparatus 100 executes is not limited to the etching processing. The processing may be film formation processing, for example.

What is claimed is:

1. A substrate processing condition setting method comprising:
    acquiring a plurality of estimation processing results by inputting a plurality of processing conditions to a trained model that is subjected to machine training based on a training processing condition and a processing result obtained by processing a substrate under the training processing condition;
    causing a display section to display an image including a distribution chart based on the estimation processing results, to display a plurality of marks on the distribution chart based on the plurality of the estimation processing results, and to display a curved response surface that is generated by interpolation between respective points of the plurality of marks or is generated by an approximate function generated based on the respective points of the plurality of marks, the marks each being user selectable through an operator to accept a user operation;
    selecting, by a user to operate the operator, one of the marks on the distribution chart in order to select one processing condition; and
    setting the one selected processing condition, as an actual processing condition in substrate processing, the one processing condition corresponding to one estimation processing result of the estimation processing results.

2. The substrate processing condition setting method according to claim 1, further comprising
    setting, prior to the acquiring, an input condition range within which a specific processing condition is included, wherein
    in the acquiring, the estimation processing results are obtained by inputting processing conditions, of the processing conditions, within the input condition range to the trained model.

3. The substrate processing condition setting method according to claim 2, wherein
    the processing conditions each include at least a concentration condition indicating a concentration of a processing liquid to be supplied to a substrate, a temperature condition indicating a temperature of the processing liquid to be supplied to the substrate, a supply amount condition indicating a supply amount of the processing liquid to be supplied to the substrate, a rotational speed condition indicating a rotational speed of the substrate, and a speed condition indicating a scan speed of a nozzle that supplies the processing liquid to the substrate.

4. The substrate processing condition setting method according to claim 1, wherein
    the image includes a distribution chart,
    the processing conditions each include a plurality of parameters, and
    the distribution chart is displayed three-dimensionally using the estimation processing results and two types of parameters of the parameters, the estimation processing results and the two types of the parameters being specified by the user.

5. The substrate processing condition setting method according to claim 4, wherein
    the display section displays a user-selectable selection area for selection of the two types of the parameters each as a variable of the distribution chart.

6. The substrate processing condition setting method according to claim 1, wherein
    the marks include:
        a first mark displayed within a specific range in the distribution chart within which a point corresponding to a target processing result is included; and
        a second mark displayed outside the specific range in the distribution chart, the second mark being different from the first mark.

7. A substrate processing method comprising:
    setting, according to the substrate processing condition setting method according to claim 1, the one processing condition as the actual processing condition; and
    performing the substrate processing under the one processing condition.

8. A substrate processing condition setting system comprising:
    storage that stores therein a training processing condition and a trained model that is subjected to machine training based on a processing result obtained by processing a substrate under the training processing condition;
    a display section;
    an operator to receive an operation by a user; and
    a controller, wherein
    the controller
        acquires a plurality of estimation processing results by inputting a plurality of processing conditions to the trained model;
        causes the display section to display an image including a distribution chart based on the estimation processing results, to display a plurality of marks on the distribution chart based on the plurality of the estimation processing results, and to display a curved response surface that is generated by interpolation between respective points of the plurality of marks or is generated by an approximate function generated based on the respective points of the plurality of marks, the marks each being user selectable through the operator; and
        upon the user's operation on the operator to select one of the marks on the distribution chart, sets one processing condition corresponding to the one selected mark as an actual processing condition in substrate processing, the one processing condition corresponding to one estimation processing result of the estimation processing results.

9. The substrate processing condition setting system according to claim 8, wherein
    the controller acquires the estimation processing results by inputting to the trained model processing conditions, of the processing conditions, within an input condition range within which a specific processing condition is included.

10. The substrate processing condition setting system according to claim 9, wherein
    the processing conditions each include at least a concentration condition indicating a concentration of a processing liquid to be supplied to a substrate, a temperature condition indicating a temperature of the processing liquid to be supplied to the substrate, a supply amount condition indicating a supply amount of the processing liquid to be supplied to the substrate, a rotational speed condition indicating a rotational speed of the substrate, and a speed condition indicating a scan speed of a nozzle that supplies the processing liquid to the substrate.

11. The substrate processing condition setting system according to claim 8, wherein
   the processing conditions each include a plurality of parameters, and
   the controller causes display of the distribution chart three-dimensionally using the estimation processing results and two types of parameters of the parameters, the estimation processing results and the two types of the parameters being specified by the user.

12. The substrate processing condition setting system according to claim 11, wherein the display section displays a user-selectable selection area for selection of the two types of the parameters each as a variable of the distribution chart.

13. The substrate processing condition setting system according to claim 8, wherein
   the marks include:
      a first mark displayed within a specific range in the distribution chart within which a point corresponding to a target processing result is included; and
      a second mark displayed outside the specific range in the distribution chart, the second mark being different from the first mark.

14. A substrate processing system comprising:
   the substrate processing condition setting system according to claim 8; and
   a processing unit that performs the substrate processing under the one processing condition.

* * * * *